(12) United States Patent
Wang et al.

(10) Patent No.: US 12,271,479 B2
(45) Date of Patent: Apr. 8, 2025

(54) REMOTE ATTESTATION METHOD, APPARATUS, SYSTEM, AND COMPUTER STORAGE MEDIUM

(71) Applicant: Huawei Technologies Co., Ltd., Shenzhen (CN)

(72) Inventors: Jian Wang, Beijing (CN); Liang Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 17/740,648

(22) Filed: May 10, 2022

(65) Prior Publication Data
US 2022/0269788 A1    Aug. 25, 2022

Related U.S. Application Data

(63) Continuation of application No. PCT/CN2020/119329, filed on Sep. 30, 2020.

(30) Foreign Application Priority Data

Nov. 11, 2019  (CN) .......................... 201911097193.6

(51) Int. Cl.
*G06F 21/57*    (2013.01)
*G06F 9/455*    (2018.01)
(Continued)

(52) U.S. Cl.
CPC ........ *G06F 21/572* (2013.01); *G06F 9/45558* (2013.01); *G06F 21/552* (2013.01);
(Continued)

(58) Field of Classification Search
CPC .. G06F 21/572; G06F 9/45558; G06F 21/552; G06F 21/554; G06F 2009/45587;
(Continued)

(56) References Cited

U.S. PATENT DOCUMENTS 9,906,493 B1 *  2/2018  Rodgers ................ H04L 63/061
10,270,770 B1 *  4/2019  Irwan .................. H04L 63/0876
(Continued)

FOREIGN PATENT DOCUMENTS

CN    101043338 A    9/2007
CN    101477602 A    7/2009
(Continued)

OTHER PUBLICATIONS

Yeluri Raghu et al: "Attestation: Proving Trustability," Mar. 27, 2014, XP055763916, 27 pages.
(Continued)

*Primary Examiner* — Bruce S Ashley
(74) *Attorney, Agent, or Firm* — Conley Rose, P.C.

(57) ABSTRACT

A remote attestation method implemented by a network device where the network device obtains an integrity measurement value of a measurement object in the network device, and sends the integrity measurement value of the measurement object to at least one of a plurality of remote attestation (RA) servers to enable the at least one RA server to perform remote attestation on integrity of the measurement object in the network device.

18 Claims, 10 Drawing Sheets

(51) Int. Cl.
*G06F 21/55* (2013.01)
*H04L 9/32* (2006.01)

(52) U.S. Cl.
CPC .......... *G06F 21/554* (2013.01); *H04L 9/3234* (2013.01); *G06F 2009/45587* (2013.01)

(58) Field of Classification Search
CPC ....... G06F 21/57; G06F 21/64; H04L 9/3234; H04L 9/0643; H04L 9/3271; H04L 63/126; H04L 67/10015; H04L 67/1001; H04L 63/123
See application file for complete search history.

(56) References Cited

U.S. PATENT DOCUMENTS

| | | |
|---|---|---|
| 10,346,614 B1 | 7/2019 | Ko |
| 10,810,015 B2 | 10/2020 | Potlapally et al. |
| 2005/0221766 A1* | 10/2005 | Brizek ................ H04W 12/108 455/73 |
| 2010/0031047 A1 | 2/2010 | Coker, II et al. |
| 2014/0143538 A1 | 5/2014 | Lindteigen |
| 2014/0337277 A1 | 11/2014 | Asenjo et al. |
| 2015/0365436 A1* | 12/2015 | Shenefiel ............... H04L 63/123 726/1 |
| 2018/0213003 A1 | 7/2018 | Faynberg et al. |
| 2019/0123903 A1 | 4/2019 | Fu et al. |
| 2019/0138729 A1* | 5/2019 | Blundell ................. G06F 21/57 |
| 2019/0243963 A1* | 8/2019 | Soriente ................ H04L 9/3247 |
| 2020/0012803 A1* | 1/2020 | Mannan ............. G06F 21/6218 |
| 2020/0099536 A1* | 3/2020 | Block ................... H04L 9/3236 |

FOREIGN PATENT DOCUMENTS

| | | |
|---|---|---|
| CN | 101784051 A | 7/2010 |
| CN | 103501303 A | 1/2014 |
| CN | 103795717 A | 5/2014 |
| CN | 105227319 A | 1/2016 |
| CN | 108833522 A | 11/2018 |
| CN | 109714168 A | 5/2019 |
| CN | 110199283 A | 9/2019 |
| CN | 110401539 A | 11/2019 |
| WO | WO-2018136087 A1 * | 7/2018 |

OTHER PUBLICATIONS

Wang, Chunlu et al: "Effectively auditing IaaS cloud servers," Globalcom 2013—Communications and Information System Security Symposium, Dec. 9, 2013, XP032604539, 7 pages.

Syed, Toqeer Ali et al: "Providing efficient, scalable and privacy preserved verification mechanism in remote attestation," International Conference on Information and Communication Technology (ICICTM), May 16, 2016, XP033083227, 10 pages.

* cited by examiner

REMOTE ATTESTATION METHOD, APPARATUS, SYSTEM, AND COMPUTER STORAGE MEDIUM

CROSS-REFERENCE TO RELATED APPLICATIONS

This application is a continuation of International Patent Application No. PCT/CN2020/119329, filed on Sep. 30, 2020, which claim priority to Chinese Patent Application No. 201911097193.6, filed on Nov. 11, 2019. The disclosures of the aforementioned applications are hereby incorporated by reference in their entireties.

TECHNICAL FIELD

This application relates to the field of routing technologies, and in particular, to a remote attestation method, an apparatus, a system, and a computer storage medium.

BACKGROUND

Software is an important part of a product. Protecting software integrity is an important guarantee for building a cyber security assurance system. Remote attestation is a necessary mitigation for integrity protection. In the current remote attestation solution, according to the requirement of the Trusted Computing Group (TCG) standard, in the startup phase of a network device, the network device calculates measurement values of the basic input/output system (BIOS), the operating system (OS), and the application (APP) level by level and extends the measurement values into the trusted platform module (TPM) chip. A remote attestation (RA) server sends an integrity challenge request to the network device, and a RA client in the network device sends a required measurement value to the RA server. The RA server verifies the measurement value to determine whether device software is tampered with, to check integrity of the device software.

In the current solution, the remote attestation system is a closed system and only a single RA server is deployed. Components, such as the hardware, the BIOS, the OS, and the APP, in the network device are provided by one vendor. Therefore, integrity measurement values of all measurement objects of the network device are sent to the RA server, and the RA server performs remote attestation on integrity in a uniform manner. This closed, centralized, and uniform remote attestation system cannot attest integrity of measurement objects in a large quantity of devices in a large-scale scenario due to bottleneck factors such as network traffic and computing resources of the system.

SUMMARY

Embodiments of this application provide a remote attestation method, an apparatus, a system, and a computer storage medium, to provide integrity and reliability attestation in an open cross-vendor scenario. The following embodiments are included.

According to a first aspect, a remote attestation method is provided, where the method is applied to a remote attestation system. The remote attestation system includes a plurality of remote attestation RA servers and a plurality of network devices, and the method is performed by any one of the plurality of network devices. In the method, the network device obtains an integrity measurement value of a measurement object in the network device; and the network device sends the integrity measurement value of the measurement object to at least one of the plurality of RA servers, so that the at least one RA server performs remote attestation on integrity of the measurement object in the network device.

According to the remote attestation method in this embodiment, a plurality of network devices is deployed in the remote attestation system, and any one of the plurality of network devices may send an integrity measurement value of a measurement object in the network device to a corresponding RA server for measurement object integrity attestation. This can overcome a problem that integrity of measurement objects in a large quantity of devices in a large-scale scenario cannot be attested in a closed remote attestation system due to bottleneck factors such as network traffic, computing resources, and attestation capabilities of the closed remote attestation system.

Optionally, the plurality of RA servers includes a plurality of first RA servers and one primary RA server. The method further includes the network device receives an integrity challenge request sent by at least one of the plurality of first RA servers; and the network device obtains, in response to the integrity challenge request, the integrity measurement value of the measurement object in the network device.

According to this implementation, according to configurations of the RA server, for example, periodic triggering or triggering by another event, the RA server sends the integrity challenge request to the network device, receives the integrity measurement value of the measurement object sent by the network device, and performs integrity attestation, so that predictability and stability of remote attestation can be improved.

Optionally, the plurality of RA servers includes a plurality of first RA servers and one primary RA server. The method further includes: The network device receives an integrity challenge request sent by the primary RA server. The network device obtains, in response to the integrity challenge request, the integrity measurement value of the measurement object in the network device; and sends the integrity measurement value of the measurement object to the primary RA server, so that the primary RA server sends the integrity measurement value of the measurement object to one of the plurality of first RA servers according to a remote attestation policy, to indicate the one of the plurality of first RA servers to perform remote attestation on integrity of the measurement object in the network device. The remote attestation policy includes at least one of the following: a time sequence relationship of remote attestation on integrity of a measurement object in each of the plurality of network devices; a correspondence between each first RA server and a measurement object on which the first RA server can perform remote attestation; a relationship between each first RA server and a range of devices measured by the first RA server; a relationship between each first RA server and a range of measurement objects measured by the first RA server; or usage or availability of a dynamic resource of each first RA server.

In this implementation, the primary RA server initiates an integrity challenge request to all of the network devices, and then after receiving integrity measurement values that are of a plurality of measurement objects and that are sent by the network devices, the primary RA server separately sends integrity measurement values of different measurement objects in the integrity measurement values of the plurality of measurement objects to at least two of the plurality of RA servers, and each RA server performs integrity attestation on a corresponding part. Such a manner in which the primary RA server initiates a challenge request and distributes measurement values facilitates centralized and uniform management and improves remote attestation efficiency.

Optionally, the network device receives the integrity challenge request sent by the at least one of the plurality of first RA servers according to a remote attestation policy. The remote attestation policy includes at least one of the following: indicating each of the plurality of first RA servers to send an integrity challenge request at a specific time point; indicating each of the plurality of first RA servers to send an integrity challenge request based on a correspondence between the first RA server and a measurement object on which the first RA server can perform remote attestation; indicating each of the plurality of first RA servers to send an integrity challenge request based on a range of devices measured by the first RA server; indicating each of the plurality of first RA servers to send an integrity challenge request based on a range of measurement objects measured by the first RA server; or indicating each of the plurality of first RA servers to send an integrity challenge request based on usage or availability of a dynamic resource of the first RA server.

In this embodiment, based on different policy options, such as examples in embodiments of this specification, when stability and reliability of remote attestation are ensured, resources can be flexibly and properly used according to various situations, to improve attestation efficiency.

Optionally, the network device performs authentication on a sender that sends the integrity challenge request, and obtaining an integrity measurement value of the measurement object in the network device after the authentication succeeds.

Security is further improved based on the authentication in this embodiment.

Optionally, the network device includes an RA client and a trusted platform module TPM chip. The RA client in the network device obtains the integrity measurement value of the measurement object in the network device from the TPM chip, where the integrity measurement value of the measurement object is stored in the TPM chip in a startup process or a running process of the network device. The RA client in the network device sends the integrity measurement value of the measurement object to the at least one of the plurality of RA servers. The measurement object in the network device includes a BIOS, an OS, one or more APPs, and one or more files, where the one or more files are stored in the TPM chip in the running process of the network device. When the network device sends the integrity measurement value of the measurement object to a plurality of RA servers, the RA client in the network device separately sends integrity measurement values of the BIOS, the OS, the one or more APPs, and the one or more files to different RA servers.

In this implementation, a range of measurement objects is expanded. Both integrity attestation on a measurement object in the startup process of the network device and integrity attestation on a file that needs to be protected in the running process of the network device are included. This improves the remote attestation scope, diversity, and capability of the system.

Optionally, the RA client includes a first RA client and a second RA client. The measurement object in the network device includes a BIOS, an OS, one or more APPs, one or more files, and one or more virtual machines (VMs), where the one or more files are stored in the TPM chip in the running process of the network device. Each of the one or more VMs includes one first RA client. The first RA client in each VM sends an integrity measurement value of each VM to an RA server corresponding to the VM. The second RA client in the network device sends an integrity measurement value of a measurement object other than the one or more VMs to an RA server corresponding to the measurement object other than the one or more VMs.

In this implementation, remote attestation can be performed on network devices in an open virtualization scenario, to improve the remote attestation scope, diversity, and capability of the system.

According to a second aspect, an embodiment of this application provides a remote attestation method, applied to a remote attestation system. The remote attestation system includes a plurality of remote attestation RA servers and a plurality of network devices, and the method is performed by a first RA server in the plurality of RA servers. In the method, the first RA server obtains an integrity measurement value of a measurement object in each network device in a first network device set, where the first network device set includes at least one network device; and then performs remote attestation on integrity of the measurement object in each network device in the first network device set based on the integrity measurement value of the measurement object in each network device in the first network device set.

According to the remote attestation method in this embodiment, a plurality of network devices is deployed in the remote attestation system, and any one of the plurality of network devices may send an integrity measurement value of a measurement object in the network device to a corresponding RA server for measurement object integrity attestation. This can overcome a problem that integrity of measurement objects in a large quantity of devices in a large-scale scenario cannot be attested in a closed remote attestation system due to bottleneck factors such as network traffic, computing resources, and attestation capabilities of the closed remote attestation system.

Optionally, the first RA server receives, from a primary RA server or a network management device, the integrity measurement value that is of the measurement object in each network device in the first network device set and that is sent by the primary RA server or the network management device according to a remote attestation policy. The remote attestation policy includes at least one of the following: a time sequence relationship of remote attestation on integrity of a measurement object in each of the plurality of network devices; a correspondence between the first RA server and a measurement object on which the first RA server can perform remote attestation; a relationship between the first RA server and a range of devices measured by the first RA server; a relationship between the first RA server and a range of measurement objects measured by the first RA server; or usage or availability of a dynamic resource of the first RA server.

In this implementation, the primary RA server initiates an integrity challenge request to all of the network devices, and then after receiving integrity measurement values that are of a plurality of measurement objects and that are sent by the network devices, the primary RA server separately sends integrity measurement values of different measurement objects in the integrity measurement values of the plurality of measurement objects to at least two of the plurality of RA servers according to different policy combinations, and each RA server performs integrity attestation on a corresponding part. Such a manner in which the primary RA server initiates a challenge request and distributes measurement values facilitates centralized and uniform management and improves remote attestation efficiency. In addition, remote attestation flexibility is ensured by using a policy combination.

Optionally, the first RA server may alternatively receive an integrity measurement value of a component in each network device in the first network device set directly from the network device.

Compared with the foregoing optional solution in which the first RA server obtains the integrity measurement value of the measurement object in each network device in the first network device set from the primary RA server, this embodiment can overcome a traffic bottleneck of the primary RA server to some extent by obtaining the integrity measurement value of the measurement object directly from the network device, reflecting an advantage of distributed remote attestation.

Optionally, the first RA server sends an attestation result of remote attestation on integrity of the measurement object in each network device in the first network device set to a primary RA server or a network management device, so that the primary RA server or the network management device performs remote attestation on network-wide integrity.

In this embodiment, integrity attestation is performed on each corresponding measurement object in a plurality of network devices in the entire remote attestation system, to form a complete trusted attestation chain, so that attestation on network-wide integrity can be implemented.

Optionally, the first RA server receives a measurement task sent by the primary RA server or the network management device, where the measurement task includes a remote attestation policy. The first RA server sends the integrity challenge request to each network device in the first network device set according to the remote attestation policy. The remote attestation policy includes at least one of the following such as indicating the first RA server to send an integrity challenge request at a specific time point; indicating a range of devices to which the first RA server sends an integrity challenge request; indicating a range of measurement objects for which the first RA server sends an integrity challenge request; or indicating the first RA server to send an integrity challenge request when usage or availability of a dynamic resource of the first RA server meets a condition.

In this embodiment, the first RA server initiates the integrity challenge request to the network device based on the measurement task delivered by the primary RA server and according to the remote attestation policy in the measurement task. Based on different policy options, such as examples in embodiments of this specification, when stability and reliability of remote attestation are ensured, resources can be flexibly and properly used according to various situations, to improve attestation efficiency. In addition, compared with a case in which the primary RA server sends an integrity challenge request to all network devices, that each RA server obtains an integrity measurement value of a measurement object directly from a network device can overcome a traffic bottleneck of the primary RA server to some extent, reflecting an advantage of distributed remote attestation.

Optionally, the first RA server obtains an integrity baseline measurement value of the measurement object in each network device in the first network device set. The first RA server compares the integrity measurement value of the measurement object in each network device in the first network device set with the integrity baseline measurement value of the measurement object in each network device in the first network device set; and when the integrity measurement value of the measurement object in each network device in the first network device set is the same as the integrity baseline measurement value of the measurement object in each network device in the first network device set, determines that remote attestation on integrity of the measurement object in each network device in the first network device set succeeds.

The first RA server obtains the integrity baseline measurement value of the measurement object in each network device in the first network device set from a device such as a website supported by the first RA server, the second RA server, or the network management device.

In this embodiment, the primary RA server may strategically send the integrity baseline measurement value of each network device to each RA server, which is corresponding to distributing the measurement task and the measurement value of the measurement object of each network device to each RA server. In this way, unnecessary integrity baseline measurement values are not sent to all RA servers, which saves resources and improves efficiency.

Optionally, the measurement object in each network device in the first network device set includes: an integrity measurement value of a BIOS, an OS, an APP, or a VM in the network device in a startup process of the network device; or an integrity measurement value of a BIOS, an OS, an APP, a VM, or one or more files in the network device in a running process of the network device, where the one or more files are files that need to be protected in the running process of the network device.

According to the remote attestation method in this embodiment, integrity attestation may be performed on a plurality of types of measurement objects, for example, a measurement object in the startup process of the network device and a measurement object in the running process of the network device such as various types of files that need to be protected during running. In addition, integrity attestation on measurement objects in a virtualization scenario is also included, which improves the remote attestation scope, diversity, and capability.

According to a third aspect, an embodiment provides a remote attestation method, applied to a remote attestation system. The remote attestation system includes a plurality of remote attestation RA servers and a plurality of network devices, the plurality of RA servers includes a plurality of first RA servers and one second RA server, the method is performed by the second RA server, and the second RA server is a primary RA server. In the method, the second RA server receives an attestation result that is of remote attestation performed by each first RA server on integrity of a measurement object in a corresponding network device and that is sent by some or all of the plurality of first RA servers separately; and the second RA server performs remote attestation on network-wide integrity based on the attestation result.

In this embodiment, each RA server sends, to the primary RA server, an integrity attestation result of a network device for which the RA server is responsible, and the primary RA server performs integrity attestation on corresponding measurement objects in the plurality of network devices in the entire remote attestation system, to form a complete trusted attestation chain. In this way, network-wide integrity of a large-scale network system is attested.

Optionally, the second RA server obtains an integrity baseline measurement value of a measurement object in each of the plurality of network devices; and the second RA server sends the integrity baseline measurement value of the measurement object in each network device to each first RA server, or the second RA server separately sends integrity baseline measurement values of measurement objects in some of the plurality of network devices to some of the plurality of first RA servers.

In this embodiment, the primary RA server may strategically send the integrity baseline measurement value of each network device to each RA server, which is corresponding to distributing the measurement task and the measurement value of the measurement object of each network device to each RA server. In this way, unnecessary integrity baseline measurement values are not sent to all RA servers, which saves resources and improves efficiency.

Optionally, the second RA server sends a measurement task to each first RA server, where the measurement task includes a remote attestation policy, and each first RA server sends an integrity challenge request to a corresponding network device according to the remote attestation policy. The remote attestation policy includes at least one of the following: indicating each first RA server to send an integrity challenge request at a specific time point; indicating each first RA server to send an integrity challenge request based on a correspondence between the first RA server and a measurement object on which the first RA server can perform remote attestation; indicating each first RA server to send an integrity challenge request based on a range of devices measured by the first RA server; indicating each first RA server to send an integrity challenge request based on a range of measurement objects measured by the first RA server; or indicating each RA server to send an integrity challenge request based on usage or availability of a dynamic resource of the first RA server.

In this embodiment, the primary RA server indicates, based on the measurement task delivered to each first RA server according to the remote attestation policy, each first RA server to initiate the integrity challenge request to the network device according to the remote attestation policy. Based on different policy options, such as examples in embodiments of this specification, when stability and reliability of remote attestation are ensured, resources can be flexibly and properly used according to various situations, to improve attestation efficiency.

Optionally, the primary RA server sends an integrity challenge request to all or some of the plurality of network devices. Accordingly, the primary RA server receives an integrity measurement value that is of the measurement object in each of the plurality of network devices and that is sent by the network device; and the primary RA server separately sends the integrity measurement value of the measurement object in each network device to some or all of the plurality of first RA servers according to a remote attestation policy, to indicate the some or all of the plurality of first RA servers to perform remote attestation on integrity of a measurement object in a corresponding network device. The remote attestation policy includes at least one of the following: a time sequence relationship of remote attestation on integrity of a measurement object in each of the plurality of network devices; a correspondence between each first RA server and a measurement object on which the first RA server can perform remote attestation; a relationship between each first RA server and a range of devices measured by the first RA server; a relationship between each first RA server and a range of measurement objects measured by the first RA server; or usage or availability of a dynamic resource of each first RA server.

In this implementation, the primary RA server initiates an integrity challenge request to all of the network devices, and then after receiving integrity measurement values that are of a plurality of measurement objects and that are sent by the network devices, the primary RA server separately sends integrity measurement values of different measurement objects in the integrity measurement values of the plurality of measurement objects to at least two of the plurality of RA servers according to different policy combinations, and each RA server performs integrity attestation on a corresponding part. Such a manner in which the primary RA server initiates a challenge request and distributes measurement values facilitates centralized and uniform management and improves remote attestation efficiency. In addition, remote attestation flexibility is ensured by using a policy combination.

Optionally, the second RA server manages and presents a result of the remote attestation.

According to this embodiment, a manager can easily manage the remote attestation effectively by using a presented attestation result.

According to a fourth aspect, an embodiment of this application provides a network device applied to a remote attestation system. The remote attestation system includes a plurality of remote attestation RA servers and a plurality of network devices, and the network device is any one of the plurality of network devices. The network device includes: an obtaining module, configured to obtain an integrity measurement value of a measurement object in the network device; and a sending module, configured to send the integrity measurement value of the measurement object to at least one of the plurality of RA servers, so that the at least one RA server performs remote attestation on integrity of the measurement object in the network device.

Optionally, the plurality of RA servers includes a plurality of first RA servers and one second RA server, and the second RA server is a primary RA server. The network device further includes a receiving module, configured to receive an integrity challenge request sent by at least one of the plurality of first RA servers. Correspondingly, the obtaining module is configured to obtain, in response to the integrity challenge request, the integrity measurement value of the measurement object in the network device. Correspondingly, the sending module is configured to send the integrity measurement value of the measurement object to the at least one of the plurality of first RA servers.

Optionally, the plurality of RA servers includes a plurality of first RA servers and one second RA server, and the second RA server is a primary RA server. The network device further includes a receiving module, configured to receive an integrity challenge request sent by the primary RA server. Correspondingly, the obtaining module is configured to obtain, in response to the integrity challenge request, the integrity measurement value of the measurement object in the network device. Correspondingly, the sending module is configured to send the integrity measurement value of the measurement object to the primary RA server, so that the primary RA server sends the integrity measurement value of the measurement object to one of the plurality of first RA servers according to a remote attestation policy, to indicate the one of the plurality of first RA servers to perform remote attestation on integrity of the measurement object in the network device. The remote attestation policy includes at least one of the following: a time sequence relationship of remote attestation on integrity of a measurement object in each of the plurality of network devices; a correspondence between each first RA server and a measurement object on which the first RA server can perform remote attestation; a relationship between each first RA server and a range of devices measured by the first RA server; a relationship between each first RA server and a range of measurement objects measured by the first RA server; or usage or availability of a dynamic resource of each first RA server.

Optionally, the receiving module is configured to receive the integrity challenge request sent by the at least one of the plurality of first RA servers according to a remote attestation policy. The remote attestation policy includes at least one of the following: indicating each of the plurality of first RA servers to send an integrity challenge request at a specific time point; indicating each of the plurality of first RA servers to send an integrity challenge request based on a correspondence between the first RA server and a measurement object on which the first RA server can perform remote attestation; indicating each of the plurality of first RA servers to send an integrity challenge request based on a range of devices measured by the first RA server; indicating each of the plurality of first RA servers to send an integrity challenge request based on a range of measurement objects measured by the first RA server; or indicating each of the plurality of first RA servers to send an integrity challenge request based on usage or availability of a dynamic resource of the first RA server.

Optionally, the network device further includes an authentication module, configured to: perform authentication on a sender that sends the integrity challenge request; and after the authentication succeeds, indicate the obtaining module to obtain the integrity measurement value of the measurement object in the network device.

Optionally, the network device includes an RA client and a trusted platform module TPM chip. The obtaining module and the sending module are disposed in the RA client. Correspondingly, the obtaining module is configured to obtain the integrity measurement value of the measurement object in the network device from the TPM chip, where the integrity measurement value of the measurement object is stored in the TPM chip in a startup process or a running process of the network device.

Optionally, the measurement object in the network device includes a BIOS, an OS, one or more APPs, and one or more files, where the one or more files are stored in the TPM chip in the running process of the network device. Correspondingly, when the network device sends the integrity measurement value of the measurement object to a plurality of RA servers, the sending module is configured to separately send integrity measurement values of the BIOS, the OS, the one or more APPs, and the one or more files to different RA servers.

Optionally, the RA client includes a first RA client and a second RA client, the first RA client and the second RA client each include the obtaining module and the sending module, the measurement object in the network device includes a BIOS, an OS, one or more APPs, one or more files, and one or more VMs, the one or more files are stored in the TPM chip in the running process of the network device, and each of the one or more VMs includes one first RA client. The sending module in the first RA client in each VM is configured to send an integrity measurement value of each VM to an RA server corresponding to the VM; and the sending module in the second RA client in the network device is configured to send an integrity measurement value of a measurement object other than the one or more VMs to an RA server corresponding to the measurement object other than the one or more VMs.

For technical effects of each embodiment of the network device, refer to descriptions in the first aspect and the optional implementations thereof. Details are not described herein again.

According to a fifth aspect, an embodiment of this application provides a remote attestation RA server, applied to a remote attestation system. The remote attestation system includes a plurality of RA servers and a plurality of network devices, where the RA server is a first RA server in the plurality of RA servers. The RA server includes an obtaining module configured to obtain an integrity measurement value of a measurement object in each network device in a first network device set, where the first network device set includes at least one network device; and an attestation module configured to perform remote attestation on integrity of the measurement object in each network device in the first network device set based on the integrity measurement value of the measurement object in each network device in the first network device set.

Optionally, the obtaining module is configured to receive, from a second RA server or a network management device, the integrity measurement value that is of the measurement object in each network device in the first network device set and that is sent by the second RA server or the network management device according to a remote attestation policy, where the second RA server is a primary RA server in the plurality of RA servers. The remote attestation policy includes at least one of the following: a time sequence relationship of remote attestation on integrity of a measurement object in each of the plurality of network devices; a correspondence between the first RA server and a measurement object on which the first RA server can perform remote attestation; a relationship between the first RA server and a range of devices measured by the first RA server; a relationship between the first RA server and a range of measurement objects measured by the first RA server; or usage or availability of a dynamic resource of the first RA server.

Optionally, the obtaining module is configured to receive an integrity measurement value of a component in each network device in the first network device set directly from the network device.

Optionally, the RA server further includes a sending module, configured to send an attestation result of remote attestation on integrity of the measurement object in each network device in the first network device set to a second RA server or a network management device, so that the second RA server or the network management device performs remote attestation on network-wide integrity, where the second RA server is a primary RA server in the plurality of RA servers.

Optionally, the sending module is further configured to send an integrity challenge request to each network device in the first network device set. Correspondingly, the obtaining module is further configured to receive a measurement task sent by the second RA server or the network management device, where the measurement task includes a remote attestation policy; and the sending module is configured to send the integrity challenge request to each network device in the first network device set according to the remote attestation policy. The remote attestation policy includes at least one of the following such as indicating the first RA server to send an integrity challenge request at a specific time point; indicating a range of devices to which the first RA server sends an integrity challenge request; indicating a range of measurement objects for which the first RA server sends an integrity challenge request; or indicating the first RA server to send an integrity challenge request when usage or availability of a dynamic resource of the first RA server meets a condition.

Optionally, the obtaining module is further configured to obtain an integrity baseline measurement value of the measurement object in each network device in the first network device set. Correspondingly, the attestation module is configured to compare the integrity measurement value of the measurement object in each network device in the first network device set with the integrity baseline measurement value of the measurement object in each network device in the first network device set; and when the integrity measurement value of the measurement object in each network device in the first network device set is the same as the integrity baseline measurement value of the measurement object in each network device in the first network device set, determine that remote attestation on integrity of the measurement object in each network device in the first network device set succeeds.

Optionally, the obtaining module is configured to obtain the integrity baseline measurement value of the measurement object in each network device in the first network device set from a device such as a website supported by the first RA server, the second RA server, or the network management device.

Optionally, the measurement object in each network device in the first network device set includes: an integrity measurement value of a BIOS, an OS, an APP, or a VM in the network device in a startup process of the network device; or an integrity measurement value of a BIOS, an OS, an APP, a VM, or one or more files in the network device in a running process of the network device, where the one or more files are files that need to be protected in the running process of the network device.

For technical effects of each embodiment of the RA server, refer to descriptions in the second aspect and the optional implementations thereof. Details are not described herein again.

According to a sixth aspect, an embodiment of this application provides a remote attestation RA server, applied to a remote attestation system. The remote attestation system includes a plurality of RA servers and a plurality of network devices, the plurality of RA servers includes a plurality of first RA servers and one second RA server, the RA server is the second RA server, and the second RA server is a primary RA server. The RA server includes: an obtaining module, configured to obtain an attestation result that is of remote attestation performed by each first RA server on integrity of a measurement object in a corresponding network device and that is sent by some or all of the plurality of first RA servers separately; and an attestation module, configured to perform remote attestation on network-wide integrity based on the attestation result.

Optionally, the obtaining module is further configured to obtain an integrity baseline measurement value of a measurement object in each of the plurality of network devices. Correspondingly, the RA server further includes a sending module, where the sending module is configured to send the integrity baseline measurement value of the measurement object in each network device to each first RA server, or separately send integrity baseline measurement values of measurement objects in some of the plurality of network devices to some of the plurality of first RA servers.

Optionally, the sending module is further configured to send a measurement task to each first RA server, where the measurement task includes a remote attestation policy, and each first RA server sends an integrity challenge request to a corresponding network device according to the remote attestation policy. The remote attestation policy includes at least one of the following such as indicating each first RA server to send an integrity challenge request at a specific time point; indicating each first RA server to send an integrity challenge request based on a correspondence between the first RA server and a measurement object on which the first RA server can perform remote attestation; indicating each first RA server to send an integrity challenge request based on a range of devices measured by the first RA server; indicating each first RA server to send an integrity challenge request based on a range of measurement objects measured by the first RA server; or indicating each RA server to send an integrity challenge request based on usage or availability of a dynamic resource of the first RA server.

Optionally, the sending module is further configured to send an integrity challenge request to all or some of the plurality of network devices.

Optionally, the obtaining module is further configured to receive an integrity measurement value that is of the measurement object in each of the plurality of network devices and that is sent by the network device. Correspondingly, the sending module is further configured to separately send the integrity measurement value of the measurement object in each network device to some or all of the plurality of first RA servers according to a remote attestation policy, to indicate the some or all of the plurality of first RA servers to perform remote attestation on integrity of a measurement object in a corresponding network device. The remote attestation policy includes at least one of the following such as a time sequence relationship of remote attestation on integrity of a measurement object in each of the plurality of network devices; a correspondence between each first RA server and a measurement object on which the first RA server can perform remote attestation; a relationship between each first RA server and a range of devices measured by the first RA server; a relationship between each first RA server and a range of measurement objects measured by the first RA server; or usage or availability of a dynamic resource of each first RA server.

Optionally, the RA server further includes a management and presentation module, where the management and presentation module is configured to manage and present a result of the remote attestation.

For technical effects of each embodiment of the RA server, refer to descriptions in the third aspect and the optional implementations thereof. Details are not described herein again.

According to a seventh aspect, an embodiment of this application provides a network device applied to a remote attestation system. The remote attestation system includes a plurality of remote attestation RA servers and a plurality of network devices, and the network device is any one of the plurality of network devices. The network device includes a memory and a processor. The memory is configured to store a computer program. The processor is configured to execute the computer program stored in the memory, to perform the method according to any one of the first aspect and the optional implementations thereof.

For technical effects of each embodiment of the network device, refer to descriptions in the first aspect and the optional implementations thereof. Details are not described herein again.

According to an eighth aspect, an embodiment of this application provides a remote attestation RA server, applied to a remote attestation system. The remote attestation system includes a plurality of RA servers and a plurality of network devices, where the RA server is a first RA server in the plurality of RA servers. The RA server includes a memory and a processor. The memory is configured to store a computer program. The processor is configured to execute the computer program stored in the memory, to perform the method according to any one of the second aspect and the optional implementations thereof.

For technical effects of each embodiment of the RA server, refer to descriptions in the second aspect and the optional implementations thereof. Details are not described herein again.

According to a ninth aspect, an embodiment of this application provides a remote attestation RA server, applied to a remote attestation system. The remote attestation system includes a plurality of RA servers and a plurality of network devices, the plurality of RA servers includes a plurality of first RA servers and one second RA server, the RA server is the second RA server, and the second RA server is a primary RA server. The RA server includes a memory and a processor. The memory is configured to store a computer program. The processor is configured to execute the computer program stored in the memory, to perform the method according to any one of the second aspect and the optional implementations thereof.

For technical effects of each embodiment of the RA server, refer to descriptions in the third aspect and the optional implementations thereof. Details are not described herein again.

According to a tenth aspect, an embodiment of this application provides a remote attestation system. The remote attestation system includes a plurality of RA servers according to any one of the fifth aspect and the optional implementations thereof and one or more RA servers according to the sixth aspect and the optional implementations thereof.

For technical effects of each embodiment of the remote attestation system, refer to descriptions in the first to the third aspects and the optional implementations thereof. Details are not described herein again.

According to an eleventh aspect, a computer-readable storage medium is provided. The computer-readable storage medium stores instructions. When the instructions are run on a computer, the computer is enabled to perform the remote attestation method according to the first aspect, the second aspect, or the third aspect.

According to a twelfth aspect, a computer program product including instructions is provided. When the program product runs on a computer, the computer is enabled to perform the remote attestation method according to the first aspect, the second aspect, or the third aspect.

DESCRIPTION OF EMBODIMENTS

The following further describes implementations of this application with reference to accompanying drawings.

It should be understood that "a plurality of" in this specification means two or more than two. In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

Figure 1:
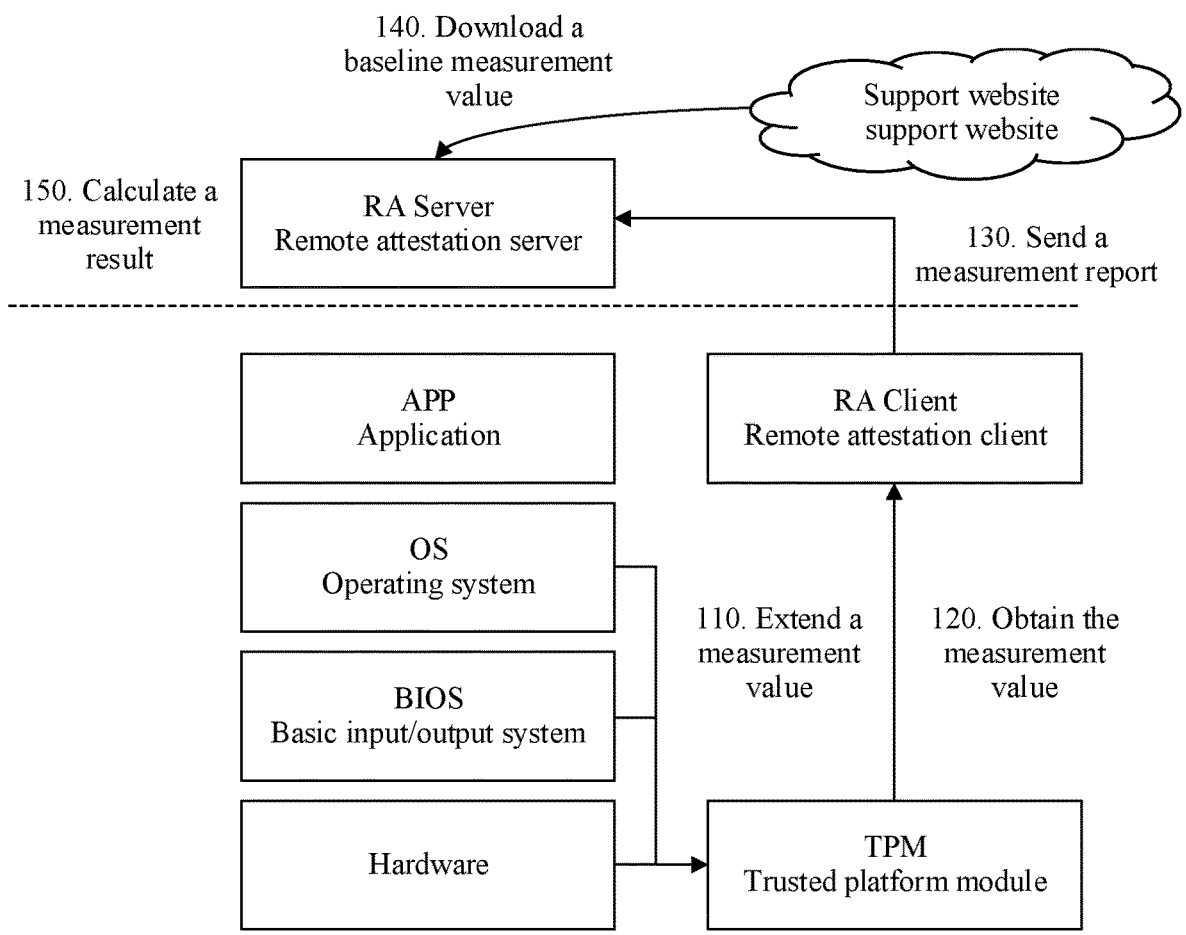
FIG. 1 is a schematic diagram of an architecture and a flowchart of a remote attestation system according to an embodiment of this application.

FIG. 1 shows a remote attestation method according to an embodiment of this application. The method includes the following steps.

Step 110. In a network device startup phase, respective measurement values of a BIOS, an OS, and an APP are extended into a TPM chip for storage.

During an implementation, after a network device is powered on, a root of trust for measurement that is protected by hardware is first executed. The hardware calculates a boot code hash value in a first phase, and subsequently calculates a hash value of a next phase in each phase in an entire process from system startup, operating system loading, to application program execution. These hash values are also referred to integrity measurement values or measurement values. A trusted platform module (TPM) provides a group of platform configuration registers (PCRs) to store these hash values. A process of storing the hash values is referred to as extending the integrity measurement values. For a process of extending a measurement value by each component in the network device, refer to a Trusted Computing Group standard specification, for example, TCG Specification Architecture Overview, Revision 1.4, and content related to this part in this document is incorporated by reference herein in its entirety. For descriptions that conflict with this application, descriptions in this application shall prevail. During an implementation, the TPM may be implemented by a chip in the network device. It should be noted that, for brevity, in the following descriptions, a measurement value is used to represent an integrity measurement value. The network device in this application may be a router, a switch, or another network device in a network.

The "component" in embodiments of this application may include a hardware component and a software component. The software component is, for example, a BIOS, an OS, or an APP. The hardware component is, for example, a basic hardware facility of the network device. Unless otherwise specified, all components described below in embodiments of this application are software components, that is, components related to integrity attestation.

Step 120. When an RA client receives a challenge request sent by an RA server, the RA client obtains a measurement value of each component in the network device from the TPM chip.

During an implementation, after startup of the network device, the RA server sends an integrity challenge request (referred to as the challenge request in the following descriptions for brevity) to the network device. After receiving the challenge request, the RA client obtains a measurement value of a corresponding component from the TPM.

Step 130. The RA client generates a measurement report based on the measurement value of each component, and sends the measurement report to the RA server.

During an implementation, the RA client obtains the measurement value of each component from the TPM to generate the measurement report, where the measurement report includes the measurement value of each component, and submits the measurement report to the RA server.

Step 140. The RA server downloads a baseline measurement value from a support website.

During an implementation, each component generates hash values of various levels of software such as a BIOS, an OS, and an APP in a version building phase. These hash values are used as integrity baseline measurement values (referred to as baseline measurement values in the following descriptions for brevity) and are released on the support website together with a system software package. The RA server is connected to the support website, obtains a baseline measurement value of each component in the network device from the support website, and stores the baseline measurement value.

Step 150. After receiving the measurement report sent by the RA client, the RA server performs integrity attestation on the network device. Calculating a measurement result in this embodiment may be considered as an implementation process of performing integrity attestation.

During an example implementation, that the RA server calculates the measurement result after receiving the measurement report sent by the RA client may be: The RA server compares the measurement value of each component in the measurement report reported by the RA client with a locally stored baseline measurement value of each component. If the values are the same, it indicates that software in the network device is not tampered with. If the values are different, it indicates that the software is tampered with. In this way, integrity attestation on the network device is completed. An administrator performs an operation based on a remote attestation result.

It can be learned from the foregoing remote attestation method that only a single RA server is deployed in the system, and the measurement values of the components in the network device, such as the BIOS, the OS, and the APP, are all sent to the RA server, so that the RA server performs remote attestation on integrity in a centralized and uniform manner. When components, software, and applications are provided by different vendors, the closed remote attestation system cannot provide reliable and effective attestation. The system cannot provide reliable and effective remote attestation in the following scenarios:

Virtualization scenario: Company A provides an infrastructure device, and customer company B provides a VM. Customer company B refuses to send a measurement value to a server of company A for attestation, and expects a server trusted by company B to complete the attestation.

Open scenario: Company A provides a software package, and company B or third-party company C provides a third-party application. Company B expects to perform integrity attestation on the third-party application.

In addition, when a single RA server cannot meet requirements of a large quantity of devices or a plurality of measurement requirements, distributed deployment is required for load balancing. Examples are as follows:

Scenario in which network-wide integrity needs to be measured: For example, company A deploys a large quantity of network devices, and company B expects to measure integrity of all devices in the entire network to ensure that software in the entire network is not tampered with. In this case, performance of a single RA server is limited, and distributed deployment is required for load balancing.

Measurement scenario in which a network device is running: With development of a plurality of runtime measurement technologies, for example, an integrity measurement architecture (IMA), the RA server needs to measure both integrity during startup and integrity of files during running or of APPs loaded after network device startup. In this case, a single RA server may not meet a large quantity of measurement requirements. Therefore, distributed deployment is required for load balancing.

For the foregoing scenarios, embodiments of this application provide the following remote attestation methods, to overcome a problem that the foregoing remote attestation system cannot provide reliable and effective integrity attestation.

Figure 2:
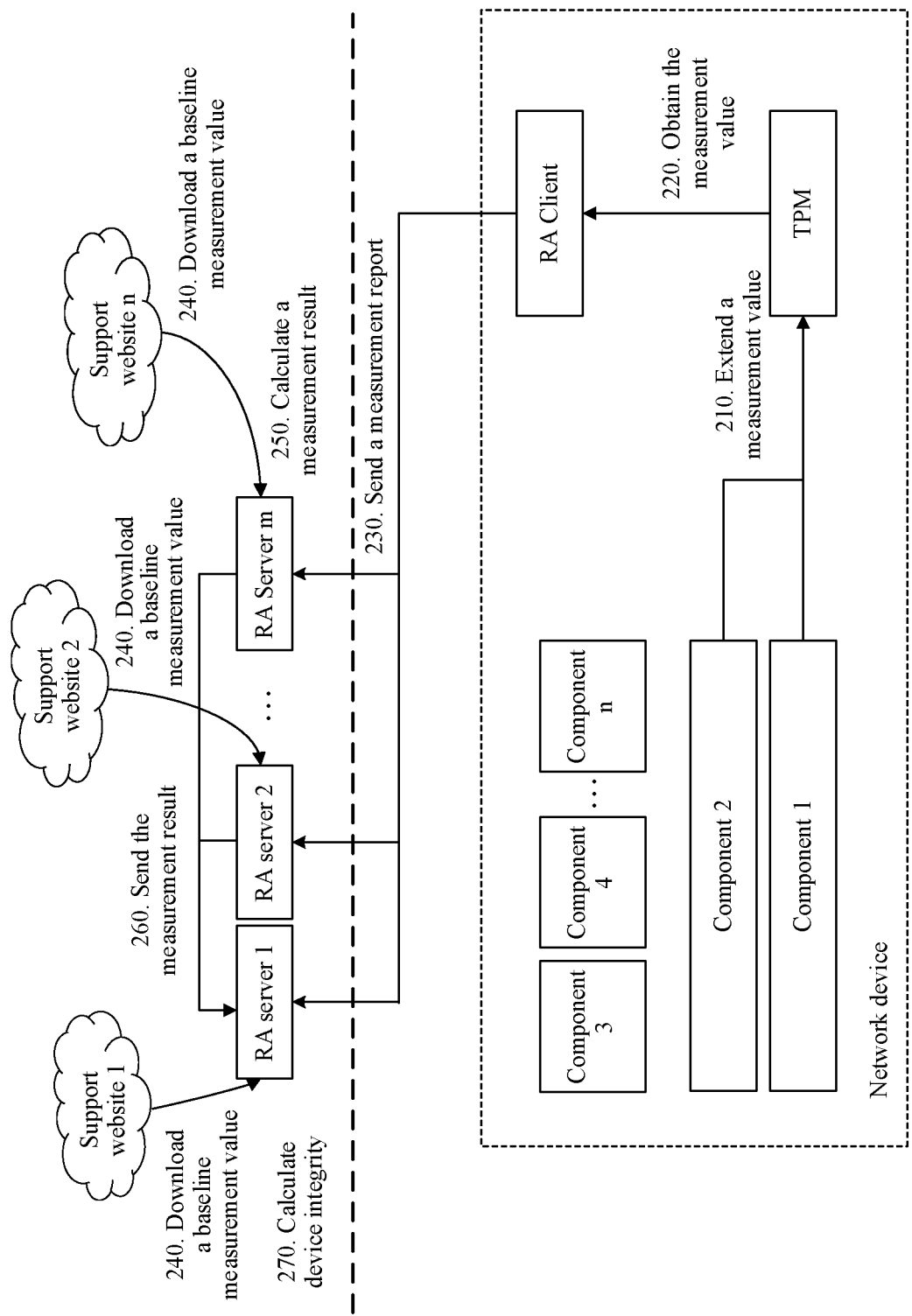
FIG. 2 is a schematic diagram of an architecture and a flowchart of a remote attestation system in an open scenario according to an embodiment of this application.

FIG. 2 is a schematic diagram of an architecture of a remote attestation system according to an embodiment of this application. The remote attestation system includes a plurality of RA servers, for example, m RA servers such as RA server 1, RA server 2, and RA server m shown in the figure, where m is a positive integer greater than 2, and a value of m depends on system deployment and openness of a component in a covered network device (for example, a degree of cross-vendor component openness), or depends on factors such as a quantity of network devices.

In an example application, relationships between the RA servers may include the following types of relationships.

Zero-coupling architecture: The RA servers do not depend on each other, but challenge respective responsible measurement objects based on respective periodicities, separately calculate measurement results of the measurement objects, and complete integrity attestation on the measurement objects. Each attestation result is displayed and managed on a single RA server. It should be noted that the "measurement object" in embodiments of this application includes all software components in the network device, such as a BIOS, an OS, and an APP, and further includes various files in the network device, such as a system file. The measurement object does not include a hardware component. For integrity attestation on various types of files in the network device, refer to detailed descriptions in the following embodiment shown in FIG. 6.

Loose coupling architecture: The RA servers include one primary RA server that manages other RA servers. The RA servers send challenge requests to the measurement objects at the same time or in sequence according to a specified remote attestation policy, separately calculate measurement results of the measurement objects, complete integrity attestation on the measurement objects, and then send attestation results of the measurement objects to the primary RA server, so that the primary RA server performs integrity attestation on the network device, and presents and manages an attestation result on the primary RA server. That is, the results are associated and need to be combined.

Strong coupling architecture: The RA servers include one primary RA server that manages other RA servers. The RA servers send challenge requests to respective responsible measurement objects in a specified sequence according to a specified remote attestation policy. A measurement result of a measurement object affects a measurement action of a next measurement object. The primary RA server schedules and manages measurement results in a uniform manner.

In the zero coupling scenario, each RA server is configured to obtain an integrity measurement value of a corresponding measurement object in the network device, and perform remote attestation on integrity of the corresponding measurement object in the network device based on the integrity measurement value of the corresponding measurement object in the network device.

In the loose coupling or strong coupling scenario, each RA server is further configured to send an attestation result of remote attestation on integrity of a corresponding measurement object in the network device to the primary RA server, so that the primary RA server performs remote attestation on device integrity of the network device.

The primary RA server receives the attestation result that is sent by each RA server and that is of remote attestation performed by the RA server on integrity of the corresponding measurement object in the network device, and performs remote attestation on device integrity of a plurality of measurement objects in the network device based on the attestation result.

It may be understood that, in another implementation, each RA server is further configured to send an attestation result of remote attestation on integrity of the corresponding measurement object in the network device to a network management device, and the network management device performs remote attestation on device integrity of the network device.

As shown in the figure, the system further includes a network device. Only one network device is shown in the figure. The network device includes a plurality of components, for example, n components such as component 1, component 2, component 3, component 4, . . . and component n, where n is a positive integer greater than 2, and n is greater than or equal to m. The network device is configured to obtain an integrity measurement value of a measurement object in the network device. The network device separately sends integrity measurement values of different measurement objects to different RA servers, so that the RA servers separately perform remote attestation on integrity of the corresponding measurement objects in the network device. It should be noted that FIG. 2 shows only one network device. In actual application, a plurality of network devices may be deployed according to an actual requirement.

As described above, the components in the network device are from at least different vendors, and remote attestation on integrity needs to be performed by different RA servers. For example, component 2 is from company A, component 3 is from company B, component 4 is from company C, and different RA servers are required to perform remote attestation on integrity. When a plurality of network devices is deployed, different components in the plurality of network devices are also from different vendors. Structures of components in other network devices may be the same as or different from that of the 1st network device.

In addition, the network device further includes a TPM chip. The TPM provides a group of PCRs, configured to store the measurement values of the measurement objects sent by the foregoing components, that is, the integrity measurement values of the measurement objects. The network device further includes an RA client. The RA client is configured to: receive an integrity challenge request sent by the RA server, obtain, from the TPM in response to the integrity challenge request, an integrity measurement value of a measurement object stored in each component, generate a measurement report, and send the measurement report to each RA server. Each RA server performs integrity attestation on a measurement value of a measurement object in the measurement report.

In addition, the system further includes a plurality of support websites. The support websites separately correspond to different RA servers, and provide baseline measurement values of the measurement objects to the corresponding RA servers, so that the RA servers calculate measurement results based on the baseline measurement values of the measurement objects, and perform integrity attestation.

Refer to FIG. 2. The following describes a remote attestation method in an open scenario and in a startup process of a network device by using an example in which the network device and RA servers are deployed to form zero coupling or loose coupling. In this specific embodiment, the method includes the following steps.

Step 210. Extend a measurement value. In a network device startup phase, each component extends an integrity measurement value of a corresponding measurement object into a TPM chip.

During an implementation, after the network device is powered on, a root of trust for measurement that is protected by component 1 is first executed. Then, component 1 calculates a code hash value of component 2 in the startup process, which may also be referred to as an integrity measurement value of a measurement object. Component 2 calculates a code hash value of component 3 or 4 in the startup process. Then, component 1 extends the code hash value of the component 2 into a platform status register PCR provided by the TPM chip. A process of extending the hash value may be understood as a process of storing the hash value. Component 2 extends the code hash value of component 3, 4, or the like into the PCR of the TPM chip. In addition to storing the code hash values, vendor identifiers associated with the components need to be stored in this embodiment of this application. During an implementation, one measurement object entry may be used as an example, and the entry includes a component vendor identifier and a code hash value. For example, component 1 obtains the code hash value of component 2 and a vendor identifier associated with component 2, and stores the code hash value of component 2 and the vendor identifier together into the PCR of the TPM chip. The storage entry includes the code hash value of component 2 and the vendor identifier associated with component 2. For a manner of extending the hash value, refer to step 110 in the embodiment shown in FIG. 1.

Step 220. Obtain the measurement value. When receiving an integrity challenge request from an RA server, an RA client obtains the integrity measurement value of the corresponding measurement object stored in the TPM chip.

During an implementation, the challenge request may carry an identifier of the RA server, which, for example, may be a vendor identifier of the RA server. After receiving the challenge request, the network device may determine, based on the identifier of the RA server in the challenge request, measurement objects whose integrity measurement values are to be sent to the RA server. For example, the identifier of the RA server may be used to match a vendor identifier that is associated with a component in a measurement object entry and that is stored in the TPM chip, and an integrity measurement value of a matched measurement object is sent to the RA server.

Optionally, the RA client in the network device performs a series of authentication operations based on an identity of the requesting RA server, for example, related information such as the identifier of the RA server. After the authentication succeeds, the RA client obtains a measurement value of a corresponding component from the TPM chip.

In addition, during an implementation, that the RA server sends the challenge request to the RA client may be determined by the RA server according to a specified remote attestation policy (for example, in a zero coupling scenario), or according to a remote attestation policy carried in a measurement task delivered by a primary RA server (for example, in a loose coupling or strong coupling scenario). In the zero coupling scenario, each RA server sends a challenge request according to remote attestation policy of the RA server, and challenge requests sent by all RA servers are not coordinated. In the loose coupling or strong coupling scenario, challenge requests sent by the RA servers according to the remote attestation policy of the primary RA server are associated to some extent. For example, the challenge requests are sent at the same time or in a specific sequence. For an implementation process, refer to detailed descriptions in the following embodiments in a load balancing scenario. It may be understood that, in the loose coupling scenario, each RA server sends a challenge request according to a remote attestation policy of the RA server. After receiving an integrity measurement value of a corresponding measurement object reported by the network device and calculating a measurement result (which may also be referred to as an integrity remote attestation result), the RA server sends the measurement result of each measurement object to the primary RA server, so that the primary RA server calculates a device integrity measurement value (also referred to as device integrity) of the network device. A zero coupling or loose coupling manner is used in the embodiment shown in FIG. 2. For details, refer to the following detailed descriptions.

In another implementation, the RA client may alternatively actively report the integrity measurement value of the measurement object to the corresponding RA server according to a specific policy, for example, periodic triggering or triggering at a specific time point. For example, the RA client reports the integrity measurement value of the measurement object to the corresponding RA server based on a policy event configured by a network administrator. In this case, the network device may store a correspondence between each RA server and a measurement object on which the RA server can perform remote attestation, and the network device determines, based on the correspondence, an RA server to which a measurement report is to be sent.

Step 230. Send the measurement report. The RA client sends the obtained measurement report of the corresponding measurement object to the corresponding RA server.

During an implementation, after obtaining the integrity measurement value of the corresponding measurement object, the RA client forms the measurement report of the corresponding measurement object, where the measurement report includes information such as the integrity measurement value of the corresponding measurement object.

As described above, the RA client obtains integrity measurement values of corresponding measurement objects according to challenge requests sent by different RA servers, and reports the integrity measurement values to the RA servers. The challenge request sent by each RA server depends on a specific situation. For example, in this embodiment, each RA server separately sends a challenge request to the RA client in the network device according to a remote attestation policy of the RA server. The RA client receives challenge requests from RA server 1 (serving as the primary RA server in the loose coupling scenario), RA server 2, . . . and RA server n. The RA client determines, based on information carried in the challenge request, for example, an RA server identifier, that RA server 1 is responsible for verifying an integrity measurement value of component 2, RA server 2 is responsible for verifying integrity measurement values of components 3 and 4, . . . and RA server n is responsible for verifying an integrity measurement value of component n. Therefore, the RA client separately sends the integrity measurement values of the corresponding measurement objects to the foregoing three RA servers for verification.

Step 240. Obtain a baseline measurement value. Each RA server downloads an integrity baseline measurement value (also referred to as baseline measurement value) from a respective support website.

During an implementation, the vendor generates integrity baseline measurement values of all measurement objects in a software version building phase. The integrity baseline measurement values and software packages (including software at all levels) are released to the support website. Each RA server is connected to a corresponding support website, obtains a baseline measurement value of the network device from the support website, and stores the baseline measurement value.

It should be noted that, in the loose coupling or strong coupling scenario, each RA server may alternatively obtain the integrity baseline measurement value of each measurement object from the primary RA server. In another implementation, each RA server may alternatively obtain the integrity baseline measurement value of each measurement object from the network management device.

It may be understood that step 240 may be performed at an early phase, and even processing of this step is completed before startup of the network device. Alternatively, after the measurement report of the network device is received, the baseline measurement value may be obtained from each support website.

Step 250. Calculate a measurement result. Each RA calculates the measurement result based on the measurement value of the measurement object in the measurement report reported by the network device.

During an implementation, each RA server compares a measurement value that is of a measurement object in the measurement report with an obtained baseline measurement value of the corresponding measurement object. If the measurement values are consistent, remote attestation on integrity of the corresponding measurement object succeeds.

In the zero coupling scenario, because there is no primary RA server, each RA server calculates the measurement result of the corresponding measurement object, completes remote attestation on integrity of the corresponding measurement object, and presents the attestation result to the network administrator. The network administrator performs corresponding operations based on the attestation result.

In an optional implementation, in the loose coupling scenario, because there is a primary RA server, each RA server sends attestation result of the RA server to the primary RA server. For details, refer to the following steps 260 and 270.

Step 260. Send the measurement result. Each RA server reports the integrity remote attestation result of the corresponding measurement object to the primary RA server.

During an implementation, RA server 1 may be set as the primary RA server in this embodiment. During an implementation, a customer may specify a trusted server as the primary RA server. Each RA server sends the attestation result of remote attestation on the integrity of the corresponding measurement object to the primary RA server. The primary RA server calculates the device integrity of the network device, that is, performs remote attestation on the device integrity of the network device.

In another implementation, a case in which the remote attestation system includes a plurality of network devices is not shown in the figure. Each network device sends the integrity measurement value of the corresponding measurement object in the network device to each RA server according to step 230, and each RA server performs remote attestation on integrity of the corresponding measurement object in the network device, and sends the attestation result to the primary RA server. The primary RA server performs remote attestation on network-wide integrity of the plurality of network devices. For details, refer to steps 360 and 370 in the following embodiment shown in FIG. 3A and FIG. 3B.

It should be noted that, in another implementation, each RA server may alternatively send the attestation result to the network management device, and the network management device performs remote attestation on device integrity of the network device or network-wide integrity of the plurality of network devices.

Step 270. Calculate device integrity. The primary RA server calculates a device measurement result, and performs remote attestation on device integrity of the network device.

During an implementation, device integrity is considered to be trusted and device integrity attestation is considered to succeed only when attestation results of integrity of all components in the network device are consistent. During an implementation, if the primary RA server and each RA server support a time synchronization mechanism, integrity calculation results of all components may correspond to a same time point, so that device integrity attestation is more reliable.

As described above, in a scenario of a plurality of network devices, the primary RA server may perform network-wide integrity attestation based on an integrity attestation result that is sent by each RA server and that is for a corresponding measurement object in each network device. If device integrity attestation on each network device succeeds, it indicates that network-wide integrity attestation on the plurality of network devices succeeds. For details, refer to steps 360 and 370 in the following embodiment shown in FIG. 3A and FIG. 3B.

The device integrity attestation and the network-wide integrity attestation are all presented and managed on the primary RA server.

It should be noted that, in addition to a technically inevitable sequence relationship between the foregoing steps, for example, in step 210 and step 220, a measurement value of a measurement object can be obtained by the RA client only after being extended into the TPM chip, and a sequence relationship between other steps is not limited. In addition, the steps in the figure do not indicate that each step is mandatory. For example, step 260 and step 270 are optional steps. Without the two steps, each RA server may independently complete integrity attestation on a part for which the RA server is responsible. With the two steps, the trusted primary RA server can complete the device integrity attestation on each measurement object in the entire network device. A sequence and optionality of steps in embodiments in the following other figures are the same. There is no limitation on a time sequence except that there is a definite technical sequence. Except a necessary step, all other steps are optional steps.

After being processed by the primary RA server through calculation, the results of the foregoing components can be all displayed and managed on the primary RA server.

In the existing technical solutions, integrity of components provided by different vendors is difficult to mutually attest. If the integrity of the components provided by the different vendors is mutually attested, information may be spread, customers may not trust the vendors, and cooperation may be more difficult. According to the open remote attestation method in the embodiment shown in FIG. 2, measurement objects of different vendors can obtain reliable and effective attestation in the system.

Figure 3A:
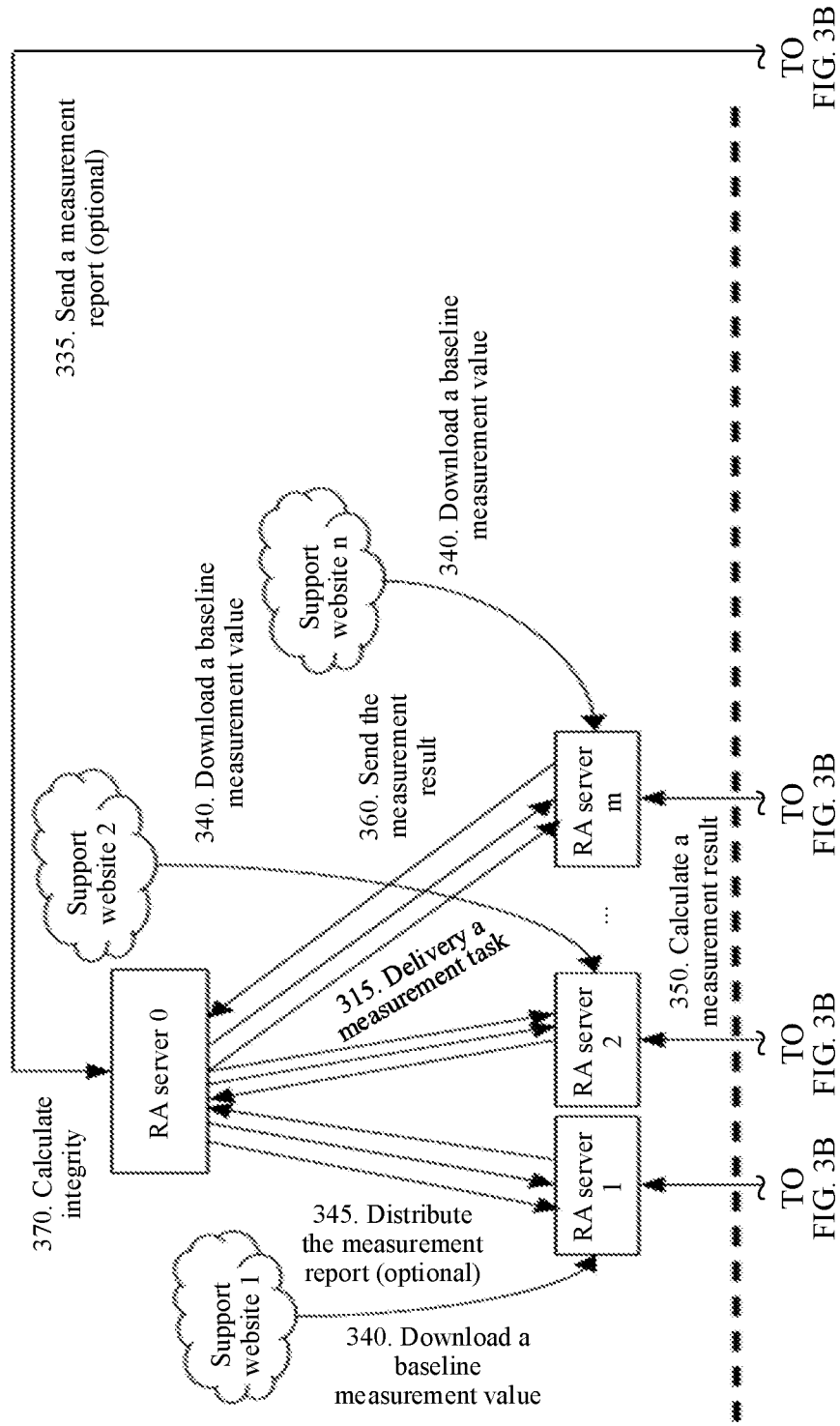
FIG. 3A and FIG. 3B are a schematic diagram of an architecture and a flowchart of a remote attestation system in an open load-sharing scenario according to an embodiment of this application.
Figure 3B:
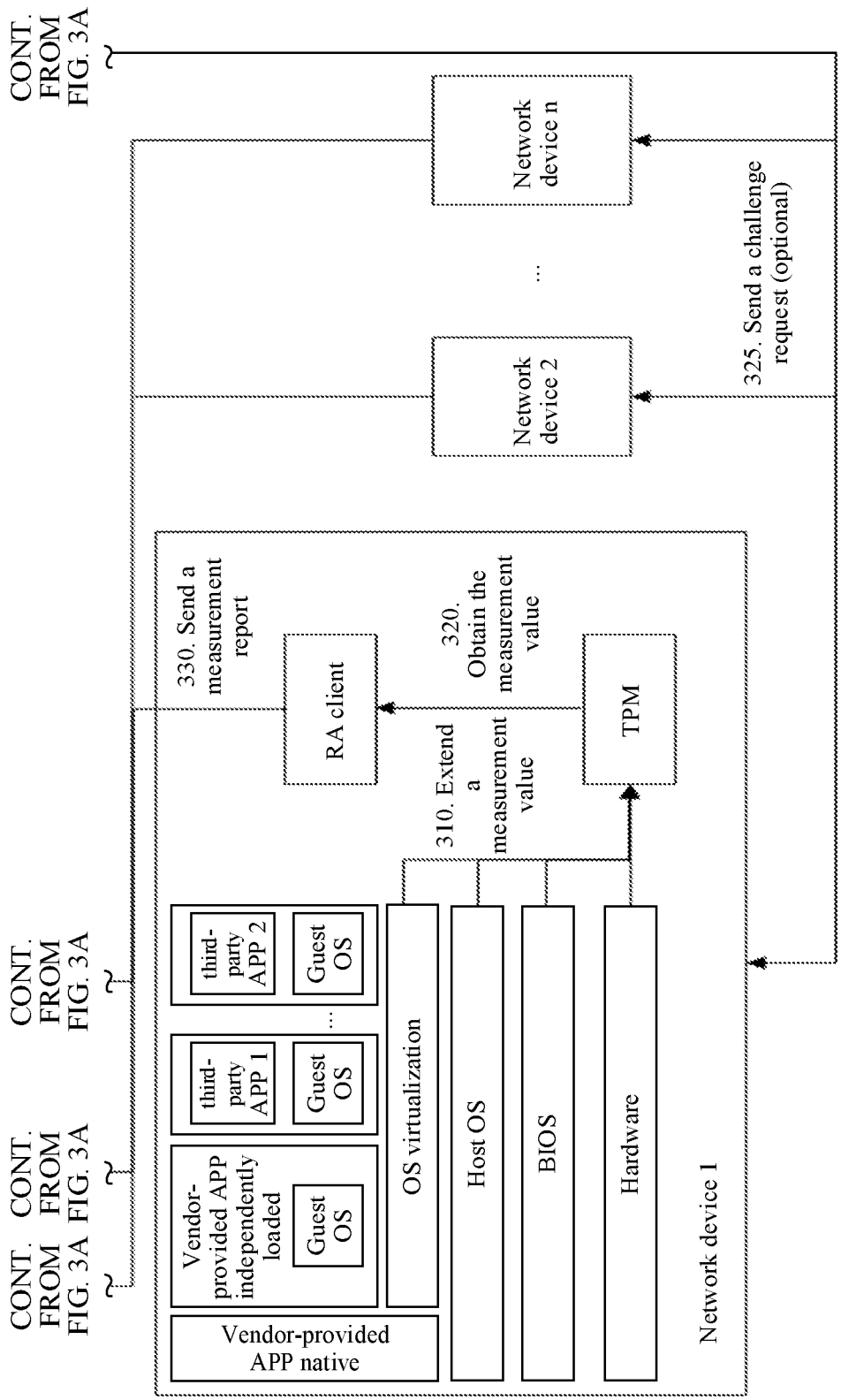

FIG. 3A and FIG. 3B show another embodiment in an open scenario according to an embodiment of this application. A remote attestation system in this embodiment includes a plurality of RA servers: RA servers 1 to m and primary RA server 0; and a plurality of network devices 1 to n. m and n are positive integers greater than 2, and n is greater than or equal to m.

In this embodiment, vendor A, customer B, and third-party C are owners of different components, each network device sends a measurement value of a corresponding measurement object to a corresponding RA server. Each RA server performs integrity attestation, and reports an attestation result to the primary RA server. The primary RA server performs device integrity attestation or network-wide integrity attestation.

Vendor A has basic components, such as hardware, a BIOS, a host OS, and OS virtualization. Customer B has third-party APP 1. Third party C has third-party APP 2. An RA server deployment architecture is as follows: The plurality of RA servers is deployed in a distributed manner. Each RA server measures integrity of the corresponding measurement object. For example, RA server 1 is responsible for integrity attestation on a measurement object of vendor A, RA server 2 is responsible for integrity attestation on a measurement object of third-party APP 1, . . . and RA server n is responsible for integrity attestation on a measurement object of third-party APP 2. Then, each RA server sends a respective attestation result to the primary RA server, that is, RA server 0. Each RA server obtains a baseline measurement value from a respective support website. In actual application, alternatively, the RA servers may all obtain baseline measurement values from the primary RA server (RA server 0). Correspondingly, the primary RA server downloads the baseline measurement values from a support website of the primary RA server. It should be noted that a homing relationship between the devices and a correspondence between the devices and the RA servers are merely examples, and there may be various combinations in actual application. This is not limited in this application.

Different from the embodiment shown in FIG. 2, in this embodiment, the primary RA server delivers a measurement task to each RA server, and each RA server sends a challenge request to a corresponding network device based on the measurement task, and receives a measurement report sent by each network device. Alternatively, the primary RA server sends a challenge request to each network device, then receives a measurement report sent by each network device, and sends the measurement report to a corresponding RA server to calculate a measurement result, to perform integrity attestation on the network device. Correspondingly, this embodiment provides two implementations depending on whether a traffic centralization manner or distribution manner is used to send the challenge request and receive the measurement report.

First implementation: In the traffic distribution implementation, the primary RA server delivers a measurement task to each RA server according to a remote attestation policy, and each RA server sends a challenge request to a corresponding measurement object in a corresponding network device based on the measurement task, and receives a measurement report sent by each network device for the corresponding measurement object.

Second implementation: In the traffic centralization implementation, the primary RA server sends a challenge request to each network device, then receives a measurement report sent by each network device, and distributes the measurement report to a corresponding RA server to calculate a measurement result, to perform integrity attestation on the network device.

It should be noted that the processing of the primary RA server in this embodiment may be replaced with that of a network management device.

The following separately describes how the devices interact with each other in the foregoing two implementations to complete device integrity attestation on the network device and network-wide integrity attestation on an entire network.

A remote attestation solution in the first implementation, that is, the traffic distribution implementation, includes the following steps.

Step 310. Extend a measurement value. In a network device startup phase, each component extends an integrity measurement value of a corresponding measurement object into a TPM chip.

During an implementation, in the network device startup phase, measurement values of a BIOS, a host OS, OS virtualization, and an APP are separately extended into the TPM chip for storage, and different vendor identifiers are set for storage. During an implementation, after the network device is powered on, a root of trust for measurement that is protected by hardware is first executed. A boot code hash value of the BIOS is calculated. Subsequently, a hash value of a next phase is calculated in each phase in an entire process from system startup, operating system loading, to application program execution. The hash value of each phase is stored in a PCR of the TPM chip. As shown in FIG. 2, in addition to storing the hash value of each phase into the TPM chip, a vendor identifier of each component is stored correspondingly. For an implementation process, refer to step 110 in the embodiment shown in FIG. 1 and step 210 in the embodiment shown in FIG. 2. Details are not described herein again.

It should be noted that, when the APP is a third-party APP rather than an APP built in the network device, storage needs to be determined based on loading and startup manners of the third-party APP. If the third-party APP is loaded before the network device is started, similar to the foregoing components such as the BIOS and the OS, an integrity measurement value of the third-party APP is extended into the TPM chip for storage in a startup process of the network device. If the third-party APP is loaded after the network device is started and is in a cold startup manner, it may also be considered that the integrity measurement value of the third-party APP is extended into the TPM chip for storage in the startup process of the network device. On the contrary, if the third-party APP is loaded after the network device is started and is in a warm startup manner, it may be considered that an integrity measurement value of the third-party APP is extended into the TPM chip for storage in a running process of the network device. In this case, refer to the integrity attestation on the measurement object in the running process of the network device in the embodiment shown in FIG. 6.

Step 315. Deliver the measurement task.

As the primary RA server, RA server 0 sends the measurement task to each RA server, to indicate each RA server to send, based on the measurement task, a challenge request to a corresponding measurement object in the network device for which the RA server is responsible.

During an implementation, RA server 0 serves as the primary RA server to send the measurement task to each RA server. The measurement task includes the remote attestation policy, to indicate each RA server to send, according to the remote attestation policy, the challenge request to the corresponding measurement object in the network device for which the RA server is responsible.

The remote attestation policy includes at least one of the following such as 1. indicating each RA server to send an integrity challenge request at a specific time point; 2. indicating each RA server to send an integrity challenge request based on a correspondence between first RA server and a measurement object on which the RA server can perform remote attestation; 3. indicating each RA server to send an integrity challenge request based on a range of devices measured by the RA server; 4. indicating each RA server to send an integrity challenge request based on a range of measurement objects measured by the RA server; or 5. indicating each RA server to send an integrity challenge request based on usage or availability of a dynamic resource of the RA server.

The following describes how to use the remote attestation policy in two scenarios.

In a first scenario, it is assumed that the remote attestation policy in the measurement task includes the foregoing items 1 to 4. In this case, each RA server sends, at a specific time point based on a time point or a time sequence relationship specified in the remote attestation policy, a challenge request to a specified range of measurement objects, in measurement objects that are of network devices in a specified range and on which the RA server can perform remote attestation.

In an example, as shown in FIG. 3A and FIG. 3B, RA server 1 is specified to be responsible for measuring an underlying basic component, and reporting a measurement result to the primary RA server. If the measurement result is incorrect, the primary RA server indicates RA servers 2 and 3 not to continue measuring an upper-layer application. If the measurement result is correct, the primary RA server indicates RA servers 2 and 3 to continue to measure upper-layer applications for which they are responsible separately. In this way, coordination of the entire system and remote attestation efficiency can be improved.

In another example, when the remote attestation system further needs to attest a file in a running process of the network device or an APP loaded after startup of the network device, RA servers 1, 2, and n are specified to be responsible for integrity attestation in the startup process of the network device, and other RA servers are specified to be responsible for system integrity attestation after system running. RA server 1 first sends a challenge request. If a measurement result is incorrect, it indicates that the software has been tampered with during startup, and it is unnecessary to perform network device runtime integrity attestation. If the measurement result is correct, other RA servers continue to perform network device runtime integrity attestation. In this way, coordination of the entire system and remote attestation efficiency can be improved.

In a second scenario, it is assumed that the remote attestation policy in the measurement task includes the first, the second, and the fifth items. In this case, each RA server sends, at a specific time point based on resource usage or availability of the RA server and a time point or a time sequence rule specified in the remote attestation policy, a challenge request to any network device that is in the remote attestation system and that corresponds to a measurement object on which the RA server can perform remote attestation.

In an example, as shown in FIG. 3A and FIG. 3B, if currently available resources of RA server 1 are extremely insufficient, the primary RA server is notified, and another RA server is arranged to be responsible for measuring an underlying basic component, so that a resource load balancing capability and remote attestation efficiency of the entire system can be improved.

It should be understood that, in actual application, different policy combinations may be selected based on different scenarios, to maximize remote attestation efficiency and reliability.

Step 320. Obtain a measurement value. When receiving an integrity challenge request from an RA server, an RA client obtains an integrity measurement value of a corresponding measurement object stored in the TPM chip.

When the RA client receives the challenge request from the RA server, the network device performs a series of authentication operations based on an identity of the requesting RA server, and then the RA client obtains the measurement value of the corresponding measurement object from the TPM chip. For an implementation process, refer to step 220 in the embodiment shown in FIG. 2.

Step 330. Send a measurement report. The RA client in each network device generates a measurement report based on the obtained measurement value of the corresponding measurement object, and sends the measurement report to the RA server that sends the challenge request.

For example, in this embodiment, an RA client in network device 1 sends a measurement report including measurement values of the BIOS, the host OS, the OS virtualization, and the APP to RA server 1, sends a measurement report including a measurement value of third-party APP 1 to RA server 2, and sends a measurement report including a measurement value of third-party APP 2 to RA server n.

Similarly, other network devices, for example, network device 2 and network device 3, send, based on settings of measurement objects in the network devices, measurement values of the corresponding measurement objects to RA servers that send challenge requests.

It should be noted that, when actively sending a measurement report, the RA client in each network device may send the measurement report to a corresponding RA server based on a locally stored correspondence between each RA server and a measurement object on which the RA server can perform remote attestation. The RA client in each network device may actively send the measurement report to the corresponding RA server according to a specific policy, for example, periodic triggering or triggering at a specific time point. For example, the RA client actively sends the measurement report to the corresponding RA server based on a policy event configured by a network administrator. In this way, the network device triggers, based on a specific event, the RA server to perform integrity attestation on the measurement object, so that integrity attestation on the network device and the entire attestation system can be more reliable and flexible.

Step 340. Obtain a baseline measurement value. Each RA server obtains the baseline measurement value from a respective support site.

It should be noted that, in this embodiment, each RA server may alternatively obtain a baseline measurement value of each measurement object from the primary RA server or the network management device. For an implementation, refer to the foregoing steps 140 and 240.

Step 350. Calculate a measurement result. Each RA calculates the measurement result based on the measurement value of the measurement object in the measurement report reported by the network device.

For an implementation process, refer to the foregoing steps 250 and 150. It should be noted that there is a plurality of network devices in this embodiment. Correspondingly, after receiving a measurement report of each network device, each corresponding RA server calculates a measurement result for each network device, and then reports the measurement result for each network device to the primary RA server.

Step 360. Send the measurement result. For an implementation process, refer to step 260. It should be noted that there is a plurality of network devices in this embodiment. Correspondingly, after receiving the measurement report of each network device, each corresponding RA server calculates the measurement result for each network device, and then reports the measurement result for each network device to the primary RA server.

Step 370. Calculate integrity.

In this embodiment, calculating the integrity by the primary RA server includes calculating device integrity of the network device to perform device integrity attestation on the network device, and calculating integrity of the entire network including a plurality of network devices to perform network-wide integrity attestation. For the device integrity attestation, refer to the foregoing step 270.

In a scenario of the network-wide integrity attestation, if measurement results sent by RA servers for corresponding measurement objects in network devices are all succeed, the primary RA server may determine that the network-wide integrity attestation succeeds. As shown in FIG. 3A and FIG. 3B, if device integrity attestation on all of network devices 1 to n succeeds, it indicates that the network-wide integrity attestation on the entire network including network devices 1 to n succeeds.

It should be noted that, similar to device integrity attestation, if the primary RA server and each RA server support a time synchronization mechanism, integrity calculation results of all components may correspond to a same time point, so that device integrity attestation is more reliable.

The foregoing device integrity attestation and the network-wide integrity attestation may be all presented and managed on the primary RA server.

A remote attestation solution in the second an implementation, that is, the traffic centralization implementation, includes the following steps.

As shown in FIG. 3A and FIG. 3B, as described above, in another implementation, the primary RA server sends a challenge request to each network device, then receives a measurement report sent by each network device, and distributes, according to a remote attestation policy, the measurement report to a corresponding RA server to calculate a measurement result, thereby performing integrity attestation on the network device. For an implementation process, refer to the following step 325, step 335, and step 345.

Implementations of step 310, step 320, and step 340 are the same as processing in the traffic distribution implementation in the first an implementation.

Step 325. Send a challenge request. The primary RA server sends the challenge request to the RA client in each network device.

Step 335. Send a measurement report. The primary RA server receives the measurement report sent by each network device.

Step 345. Distribute the measurement report. The primary RA server or the network management device distributes, to a corresponding RA server, the received measurement report sent by each network device, to calculate a measurement result.

The primary RA server may send the challenge request to each network device in the following two manners:

Manner 1: The primary RA server sends a challenge request, where the challenge request may be used to notify each network device to send a measurement value of a measurement object in the network device. Then, after receiving a measurement report sent by each network device, the primary RA server distributes the measurement report to a corresponding RA server according to the remote attestation policy, and each RA server calculates a measurement result based on the received measurement report, and reports a calculation result to the primary RA server to perform device integrity and/or network-wide integrity attestation.

Manner 2: The primary RA server may alternatively send a challenge request according to the remote attestation policy, to notify each network device to separately send measurement reports for measurement values of different measurement objects. Then the primary RA server separately sends the measurement reports to corresponding RA servers to calculate measurement results, and perform device integrity and/or network-wide integrity attestation based on a measurement result reported by each RA server.

In the foregoing two manners, regardless of whether different challenge requests are sent to different network devices according to the remote attestation policy, or a challenge request is sent and then measurement reports of different network devices are distributed to different RA servers according to the remote attestation policy, for the remote attestation policy, refer to the detailed descriptions of step 315. That is, different policy combinations may be selected based on different scenarios, to maximize remote attestation efficiency and reliability.

Step 350. Calculate a measurement result. Each RA calculates the measurement result based on the measurement value of the measurement object in the measurement report reported by the network device.

Step 360. Send the measurement result.

Step 370. Calculate integrity.

For implementations of the foregoing step 350 to step 370, refer to detailed descriptions of similar processing processes corresponding to step 250, step 260, and step 270 in FIG. 2. Details are not described herein again.

A load balancing factor is considered in an open scenario in the remote attestation solution in this embodiment. With management of the primary RA server and coordination and cooperation between the primary RA server and each RA server, remote attestation on integrity of a large quantity of network devices and a highly open network system can be reliably and effectively performed.

Figure 4:
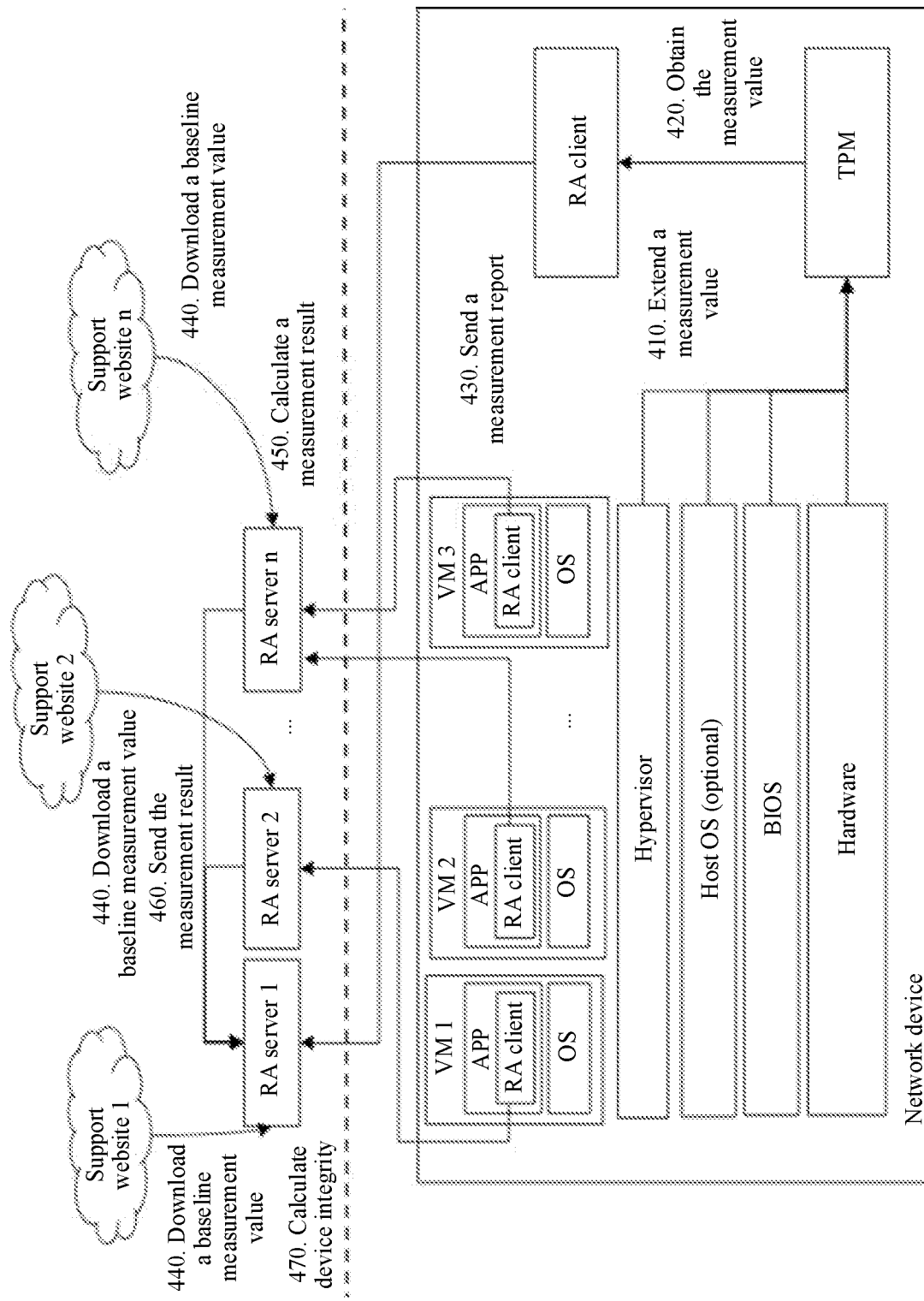
FIG. 4 is a schematic diagram of an architecture and a flowchart of a remote attestation system in an open virtualization scenario according to an embodiment of this application.

FIG. 4 shows an embodiment of an open scenario combined with a virtualization scenario according to this application. In this embodiment, vendor A provides underlying hardware and infrastructure software, such as a BIOS, a host OS, and a hypervisor, customer B provides VM 1 and VM 2, and OSs and APPs in VM 1 and VM 2, and customer C provides VM 3 and an OS and an APP in VM 3. Different vendors use their own RA servers for remote attestation. For example, RA server 1 is responsible for integrity attestation on a measurement object of vendor A, RA server 2 is responsible for integrity attestation on a measurement object of VM 1 provided by customer B, and RA server n is responsible for integrity attestation on measurement objects of VM 2 and VM 3 provided by customer C. Then, each RA server sends an integrity attestation result of a corresponding measurement object to the primary RA server. In this embodiment, RA server 1 is used as the primary RA server. It may be understood that RA server 1 serving as the primary RA server not only performs device integrity attestation on a network device, but also performs an integrity attestation task on a measurement object for which RA server 1 is responsible. For example, in this embodiment, RA server 1 performs integrity attestation on measurement objects such as the BIOS, the host OS, and the hypervisor. It may be understood that a homing relationship between the components and a correspondence between the devices and the RA servers are merely examples, and there may be various combinations in actual application. This is not limited in this application.

This embodiment includes the following steps.

Step 410. Extend a measurement value. In a network device startup phase, each component extends an integrity measurement value of a corresponding measurement object into a TPM chip.

During an implementation, in the network device startup phase, measurement values of the BIOS, the host OS (optional), and the hypervisor are separately extended into the TPM chip for storage, and vendor identifiers of all measurement objects are also stored together. For an implementation process, refer to step 110 in the embodiment shown in FIG. 1, step 210 in the embodiment shown in FIG. 2, and step 310 in the embodiment shown in FIG. 3A and FIG. 3B. Details are not described herein again.

Step 420. Obtain the measurement value. When receiving an integrity challenge request from an RA server, an RA client obtains the integrity measurement value of the corresponding measurement object stored in the TPM chip.

Different from the foregoing embodiments shown in FIG. 2 and FIG. 3A and FIG. 3B, in this embodiment, there are a plurality of RA clients, and each VM has an RA client, of the VM, that may become a first RA client. After each RA server sends a challenge request to the network device, each first RA client obtains the measurement value of the corresponding measurement object from the TPM chip after receiving the corresponding challenge request. It should be noted that, in an implementation in which full virtualization is not implemented, each VM may not support a separate RA client instance. In this case, similar to the embodiments shown in FIG. 2 and FIG. 3A and FIG. 3B, a host RA client in the network device receives the challenge request from each RA server.

In this embodiment, the RA client in VM 1 receives the challenge request for the measurement object of VM 1 that is sent by RA server 1, the RA clients in VM 2 and VM 3 receive the challenge requests for the measurement objects of VM 2 and VM 3 that are sent by RA server n, and a second RA client (which may also be referred to as a host client) corresponding to other components in the network device, for example, the BIOS, the host OS (optional), and the hypervisor, receives challenge requests sent by RA server 1 for these basic components.

After receiving the challenge request from the corresponding RA server, each RA client obtains a measurement value of a corresponding measurement object from the TPM chip. For an implementation process, refer to step 120, step 220, and step 320.

Step 430. Send the measurement report. The RA client in the network device sends the obtained measurement report of the corresponding measurement object to the corresponding RA server.

As described above, the host RA client and the RA client in each VM each send a measurement report of a corresponding measurement object to a corresponding RA server according to a requirement of the RA server that sends the challenge request. For an implementation process, refer to step 130, step 230, and step 330.

For implementations of step 440 to step 470, refer to detailed descriptions of corresponding similar processing processes in FIG. 1 to FIG. 3B. Details are not described herein again.

As described above, as services are increasingly popularly applied to open and virtualization scenarios, integrity of different components provided by different vendors is difficult to mutually attest. If the integrity of the components provided by the different vendors is mutually attested, information may be spread, customers may not trust the vendors, and cooperation may be more difficult. The remote attestation solution provided in this embodiment combines the open scenario and the virtualization scenario. With management of the primary RA server and coordination and cooperation between the primary RA server and each RA server, remote attestation on integrity of a large-scale and highly open network system can be reliably and effectively performed in the virtualization scenario. In addition, mutual trust and information security between customers, device providers, and component providers can be provided.

Figure 5:
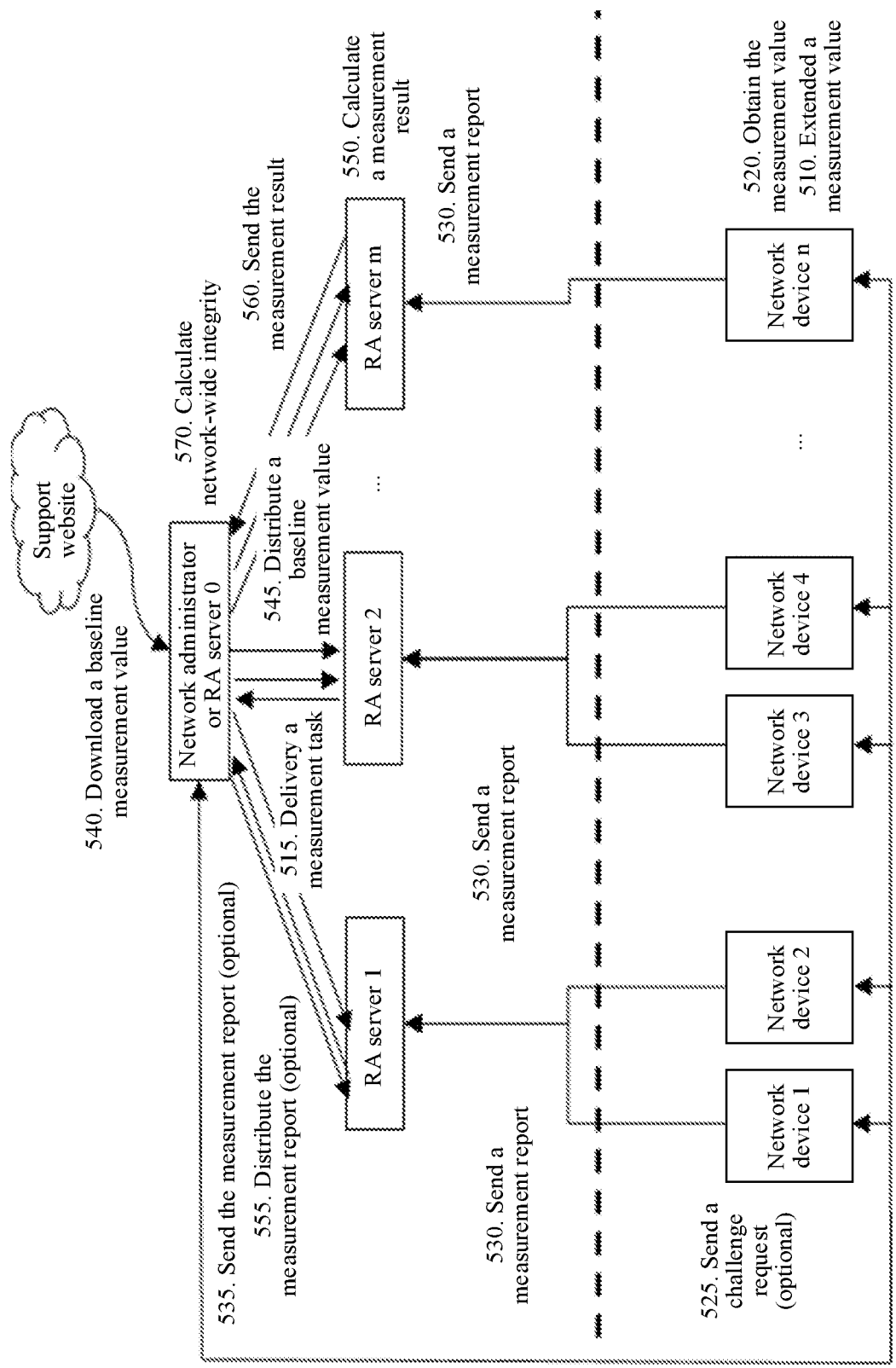
FIG. 5 is a schematic diagram of an architecture and a flowchart of a remote attestation system in a load-sharing scenario according to an embodiment of this application.

It may be understood that, after reading embodiments of this application, the virtualization scenario shown in FIG. 4 may apply to the embodiment shown in FIG. 3A and FIG. 3B, or may apply to the following scenario shown in FIG. 5. In an example, three scenarios such as open, virtualization, and load balancing simultaneously apply to one implementation solution.

As described above, an enterprise may deploy a large quantity of network devices to meet service requirements. To ensure integrity of devices in the entire network, integrity of measurement objects of all or some devices needs to be attested. A single RA server may encounter a performance bottleneck or node failure, and a plurality of RA servers are required for distributed computing. FIG. 5 provides an embodiment of such a remote attestation system.

FIG. 5 describes how to perform distributed remote attestation in such a large-scale network scenario by using an example in which all measurement objects in a plurality of network devices in the network belong to a same vendor. It may be understood that, when measurement objects in the network devices belong to different vendors, and therefore different RA servers are required to separately perform device integrity attestation on the network devices, for a processing process in this open scenario, refer to the processing processes in the embodiments shown in FIG. 2 and FIG. 3A and FIG. 3B.

As shown in FIG. 5, the remote attestation system includes a plurality of RA servers, for example, a total of m+1 RA servers from RA server 0 to RA server m, n network devices, and a support website, where m is a positive integer greater than 2, and n is greater than or equal to m. In this embodiment, RA server 0 serves as a primary RA server. It should be noted that, in another implementation, a network management device may alternatively serve as a primary RA server. Other RA servers are responsible for integrity attestation tasks of some network devices. The primary RA server or the network management device is connected to the support website and downloads a baseline measurement value from the site. The m RA servers are connected to and communicate with the primary RA server or the network management device, obtain a measurement task delivered by the primary RA server or the network management device, and obtain a baseline measurement value. In addition, the m RA servers are connected to the n network devices, and perform remote attestation on integrity of the network devices for which the m RA servers are responsible. For ease of understanding, in FIG. 5, RA server 1 is responsible for performing remote attestation on device integrity of network device 1 and network device 2, RA server 2 is responsible for performing remote attestation on device integrity of network device 3 and network device 4, . . . and RA server m is responsible for performing remote attestation on device integrity of network device n. Network device 1 and network device 2 form a first network device set, network device 3 and network device 4 form a second network device set, and network device n forms an nth network device set. It may be understood that each network device set may include more network devices. The foregoing division is merely an example. In actual application, RA servers and network devices that the RA servers are responsible for performing integrity remote attestation on device integrity may be determined according to a remote attestation policy.

In the system architecture shown in FIG. 5, this embodiment provides two implementations depending on whether a traffic centralization manner or distribution manner is used to send a challenge request and receive a measurement report.

First implementation: In the traffic distribution implementation, the primary RA server delivers a measurement task to each RA server according to the remote attestation policy, and each RA server sends a challenge request to a corresponding network device based on the measurement task, and receives a measurement report sent by each network device.

Second implementation: In the traffic centralization implementation, the primary RA server sends a challenge request to each network device, then receives a measurement report sent by each network device, and distributes the measurement report to a corresponding RA server to calculate a measurement result, to perform integrity attestation on the network device.

The following separately describes how the devices interact with each other in the foregoing two implementations to complete device integrity attestation on the network device and network-wide integrity attestation on an entire network.

A remote attestation solution in the first implementation, that is, the traffic distribution implementation, includes the following steps.

Step 510. Extend a measurement value.

Each network device obtains a measurement value of a measurement object in the network device, and an implementation process is determined based on a status of the measurement object deployed in the network device. For an example obtaining manner, refer to step 110, step 210, step 310, and step 410 in the foregoing embodiments.

Step 515. Deliver a measurement task.

In the traffic distribution implementation, the primary RA server or the network management device sends a measurement task to each RA server, to indicate each RA server to send, based on the measurement task, a challenge request to a measurement object in a network device for which the RA server is responsible.

During an implementation, RA server 0 serves as the primary RA server to send the measurement task to each RA server. The measurement task includes the remote attestation policy, to indicate each RA server to send, according to the remote attestation policy, the challenge request to the corresponding measurement object in the network device for which the RA server is responsible.

The remote attestation policy includes at least one of the following such as 1. indicating each RA server to send an integrity challenge request at a specific time point; 2. indicating each RA server to send an integrity challenge request based on a correspondence between first RA server and a measurement object on which the RA server can perform remote attestation (where this policy applies to a solution in which an open scenario and a load balancing scenario are combined); 3. indicating each RA server to send an integrity challenge request based on a range of devices measured by the RA server; 4. indicating each RA server to send an integrity challenge request based on a range of measurement objects measured by the RA server; or 5. indicating each RA server to send an integrity challenge request based on usage or availability of a dynamic resource of the RA server.

The following describes how to use the remote attestation policy in two scenarios.

In a first scenario, it is assumed that the remote attestation policy in the measurement task includes the first and the third items. In this case, each RA server sends, at a specific time point based on a time point or a time sequence relationship specified in the remote attestation policy, a challenge request to a specified range of network devices or measurement objects in the network devices.

In an example, as shown in FIG. 5, RA server 1 is indicated to send a challenge request to network device 1 and network device 2 at a specific time point or based on a specific periodicity, RA server 2 is indicated to send a challenge request to network device 3 and network device 4 at the specific time point, . . . and RA server m is indicated to send a challenge request to network device n at the specific time point. Each RA server performs device integrity attestation on a measurement object in a corresponding network device, to complete integrity attestation in a specific device range. In addition, a plurality of RA servers calculates measurement results of a plurality of network devices in a distributed manner, especially in a case in which measurement tasks of each single network device are heavy. This resolves a resource limitation problem caused by one RA server calculating measurement results of a plurality of network devices, and overcomes a resource bottleneck.

In a second scenario, it is assumed that the remote attestation policy in the measurement task includes the first and the fifth items. In this case, each RA server sends, at a specific time point based on resource usage or availability of the RA server and a time point or a time sequence rule specified in the remote attestation policy, a challenge request to any network device in the remote attestation system.

In an example, as shown in FIG. 5, if currently available resources of RA server 1 are extremely insufficient, the primary RA server is notified, and another RA server is arranged to be responsible for remote attestation on integrity of measurement objects of network device 1 and network device 2, so that a resource load balancing capability and remote attestation efficiency of the entire system can be improved.

It should be understood that, in actual application, different policy combinations may be selected based on different scenarios, to maximize remote attestation efficiency and reliability.

Step 520. Obtain a measurement value.

When receiving an integrity challenge request from the RA server, an RA client in each network device obtains an integrity measurement value of a corresponding measurement object stored in a TPM chip. In this implementation, after receiving the challenge request sent by the corresponding RA server, the network device obtains measurement values of all or some measurement objects in the network device. For an implementation process, refer to processing of corresponding similar parts in step 120, step 220, step 320, and step 420 in the foregoing embodiments.

Step 530. Send a measurement report.

As described above, in a traffic distribution implementation, the primary RA server or the network management device sends a measurement task to each RA server, to indicate each RA server to send, based on the measurement task, a challenge request to a measurement object in a network device for which each RA server is responsible, and then each network device sends a measurement report to the RA server that sends the challenge request. For a process, refer to processing of corresponding similar parts in step 130, step 230, step 330, step 430, and step 530 in the foregoing embodiments.

Step 540. Download a baseline measurement value. For an implementation, refer to processing of corresponding similar parts in step 240, step 340, and step 440 in the foregoing embodiments.

Step 545. Distribute the baseline measurement value. After obtaining the baseline measurement value of the measurement object in each network device from the support website, the primary RA server or the network management device distributes the baseline measurement value of the measurement object in each network device to each RA server. Alternatively, baseline measurement values of measurement objects in different network devices may be separately sent to different RA servers. A specific distribution manner is related to remote attestation on integrity of network devices that each RA server is responsible for. That is, the primary RA server or the network management device may separately send baseline measurement values of measurement objects in different network devices to different RA servers in the manner of distributing the measurement task in the step 515. It may be understood that the baseline measurement value of the measurement object in step 545 may be carried in the measurement task in the step 515 for distribution.

Step 550. Calculate a measurement result. Each RA server performs remote attestation on device integrity of the network device.

Step 560. Send the measurement result. Each RA server sends an attestation result of remote attestation on device integrity of each network device to the primary RA server or the network management device.

Step 570. Calculate network-wide integrity. The primary RA server or the network management device performs remote attestation on network-wide integrity.

For implementations of the foregoing step 550 to step 570, refer to detailed descriptions of corresponding similar processing processes in FIG. 2 to FIG. 4. Details are not described herein again.

A remote attestation solution in the second an implementation, that is, the traffic centralization implementation, includes the following steps.

Step 540 and step 545. implementations are the same as processing in the traffic distribution implementation in the first implementation. It should be noted that, in another implementation, the distribution baseline measurement value in step 545 and a distribution measurement report in the following step 535 may be sent to each RA server together.

Step 510 and step 520. implementations are the same as processing in the traffic distribution implementation in the first implementation.

Step 525. Send a challenge request. The primary RA server or the network management device sends the challenge request to the RA client in each network device.

Step 535. Send a measurement report. Each network device sends the measurement report of each network device to the primary RA server or the network management device.

Step 555. Distribute the measurement report. The primary RA server or the network management device distributes, to a corresponding RA server, the received measurement report sent by each network device, to calculate a measurement result.

The primary RA server may send the challenge request to each network device in the following two manners:

Manner 1: The primary RA server sends a challenge request, where the challenge request may be used to notify each network device to send a measurement value of a measurement object in the network device. Then, after receiving a measurement report sent by each network device, the primary RA server distributes the measurement report to a corresponding RA server according to the remote attestation policy, and each RA server calculates a measurement result based on the received measurement report, and reports a calculation result to the primary RA server to perform device integrity and/or network-wide integrity attestation.

Manner 2: The primary RA server may alternatively send a challenge request according to the remote attestation policy, to notify each network device to separately send measurement reports for measurement values of different measurement objects. Then the primary RA server separately sends the measurement reports to corresponding RA servers to calculate measurement results, and perform device integrity and/or network-wide integrity attestation based on a measurement result reported by each RA server.

It may be understood that the foregoing two manners are merely examples for description, and this application is not limited to the two manners.

In the foregoing two manners, regardless of whether different challenge requests are sent to different network devices according to the remote attestation policy, or a challenge request is sent and then measurement reports of different network devices are distributed to different RA servers according to the remote attestation policy, for the remote attestation policy, refer to the detailed descriptions of step 515 and step 315 in the embodiment shown in FIG. 3A and FIG. 3B. That is, different policy combinations may be selected based on different scenarios, to maximize remote attestation efficiency and reliability.

Step 550. Calculate a measurement result. Each RA server performs remote attestation on device integrity of each network device.

Step 560. Send the measurement result. Each RA server sends an attestation result of remote attestation on device integrity of each network device to the primary RA server or the network management device.

Step 570. Calculate network-wide integrity. The primary RA server or the network management device performs remote attestation on network-wide integrity.

For implementations of the foregoing step 550 to step 570, refer to detailed descriptions of corresponding similar processing processes in FIG. 2 to FIG. 4. Details are not described herein again.

In the remote attestation system provided in this embodiment shown in FIG. 5, the plurality of RA servers is deployed for distributed calculation. The primary RA server and other RA servers work together, to resolve a problem that network-wide integrity cannot be reliably attested due to deployment of a plurality of network devices by the enterprise, and avoid a performance bottleneck or a node fault that may occur on a single RA server.

Figure 6:
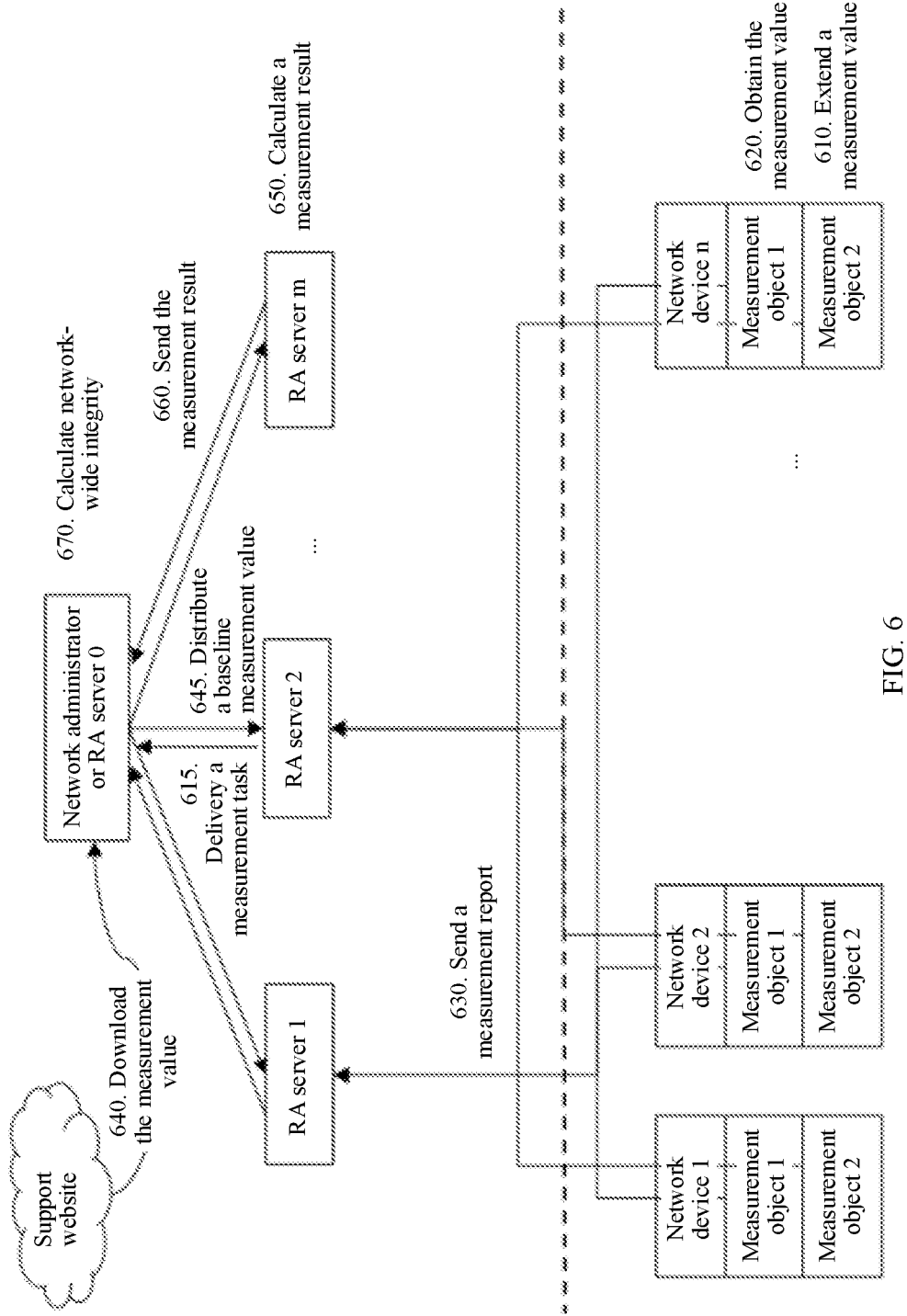
FIG. 6 is a schematic diagram of an architecture and a flowchart of a remote attestation system in a measurement scenario in which a network device is running according to an embodiment of this application.

As mentioned above, with the development of a plurality of runtime measurement technologies, for example, the IMA, an RA server needs to measure both integrity during startup and integrity of files during running. A single RA server may not meet a large quantity of measurement requirements, and distributed deployment is required for load balancing. FIG. 6 provides an embodiment of such a remote attestation system.

In FIG. 6, an example in which measurement objects of a plurality of network devices in the network belong to a same vendor is used to describe when there is a plurality of measurement requirements, different work division of a plurality of RA servers and how to perform distributed remote attestation in a load balancing scenario. It may be understood that, when measurement objects in the network devices belong to different vendors, and therefore different RA servers are required to separately perform device integrity attestation on the network devices, for a processing process in this open scenario, refer to the processing processes in the embodiments shown in FIG. 2 and FIG. 3A and FIG. 3B.

As shown in FIG. 6, the remote attestation system includes a plurality of RA servers, for example, a total of m+1 RA servers from RA server 0 to RA server m, n network devices, and a support website, where m is a positive integer greater than 2, and n is greater than or equal to m. In this embodiment, RA server 0 serves as a primary RA server. It should be noted that, in another implementation, a network management device may alternatively serve as a primary RA server.

Other RA servers are responsible for integrity attestation tasks of some network devices. For example, RA server 1 is responsible for remote attestation on integrity of measurement object 1 in each network device, and RA server 2 is responsible for remote attestation on integrity of measurement object 2 in each network device. Measurement object 1 is a level of software involved in a startup process of the network device, for example, the BIOS, the OS, or the APP in the foregoing embodiments. Measurement object 2 is files, such as system files and important files, that need to be protected during running of the network device. As described above, if the third-party APP is loaded after the network device is started and is in a warm startup manner, it may be considered that an integrity measurement value of the third-party APP is extended into the TPM chip for storage in a running process of the network device. The third-party APP also belongs to measurement object 2.

The primary RA server or the network management device is connected to the support website and downloads a baseline measurement value from the site. The m RA servers are connected to and communicate with the primary RA server or the network management device, obtain a measurement task delivered by the primary RA server or the network management device, and obtain a baseline measurement value. In addition, the m RA servers are connected to the n network devices, and perform remote attestation on integrity of the measurement object in the network devices for which the m RA servers are responsible. It may be understood that the foregoing division is merely an example. In an application, RA servers and network devices that the RA servers are responsible for performing integrity remote attestation on device integrity may be determined according to a remote attestation policy.

In the system architecture shown in FIG. 5, the primary RA server delivers a measurement task to each RA server according to the remote attestation policy, and each RA server sends a challenge request to a corresponding network device based on the measurement task, and receives a measurement report sent by each network device. That is, similar to the traffic distribution implementation in FIG. 3A and FIG. 3B and FIG. 5 (where the traffic centralization implementation and the traffic distribution implementation are classified based on sending of the challenge request and receiving of the measurement report). It may be understood that, in another implementation, the traffic centralization implementation in the embodiments shown in FIG. 3A and FIG. 3B and FIG. 5 may alternatively be used. That is, the primary RA server sends a challenge request to each network device, then receives a measurement report sent by each network device, and distributes the measurement report to the corresponding RA server to calculate a measurement result and perform integrity attestation on the network device. For an implementation process of this manner, refer to the detailed descriptions of the process of the traffic centralization implementation in the embodiment shown in FIG. 3A and FIG. 3B or FIG. 5.

The following describes in detail how devices interact with each other in the traffic distribution implementation to complete device integrity attestation on the network device and network-wide integrity attestation on the entire network. The implementation includes the following steps.

Step 610. Extend a measurement value.

Each network device obtains a measurement value of a measurement object in the network device, and an implementation process is determined based on a status of the measurement object deployed in the network device. For an obtaining manner, refer to step 110, step 210, step 310, and step 410 in the foregoing embodiments. It should be noted that, in this embodiment, in addition to a measurement value of a measurement object in a startup process of the network device, a measurement value of a measurement object in a running process of the network device further needs to be extended into a TPM chip.

Step 615. Deliver a measurement task.

The primary RA server or the network management device sends the measurement task to each RA server, to indicate each RA server to send, based on the measurement task, a challenge request to a measurement object in a network device for which the RA server is responsible.

During an implementation, RA server 0 serves as the primary RA server to send the measurement task to each RA server. The measurement task includes the remote attestation policy, to indicate each RA server to send, according to the remote attestation policy, the challenge request to the corresponding measurement object in the network device for which the RA server is responsible.

The remote attestation policy includes at least one of the following such as 1. indicating each RA server to send an integrity challenge request at a specific time point; 2. indicating each RA server to send an integrity challenge request based on a correspondence between first RA server and a measurement object on which the RA server can perform remote attestation (where for example, a relationship between RA server 1 and measurement object 1 and a relationship between RA server 2 and measurement object 2 in this embodiment); 3. indicating each RA server to send an integrity challenge request based on a range of devices measured by the RA server; 4. indicating each RA server to send an integrity challenge request based on a range of measurement objects measured by the RA server; or 5. indicating each RA server to send an integrity challenge request based on usage or availability of a dynamic resource of the RA server.

The following describes how to use the remote attestation policy in two scenarios.

In a first scenario, it is assumed that the remote attestation policy in the measurement task includes the first and the third items. In this case, each RA server sends, at a specific time point based on a time point or a time sequence rule specified in the remote attestation policy, a challenge request to a specified range of network devices.

In an example, as shown in FIG. 6, RA server 1 is indicated to send a challenge request to network device 1, network device 2, and network device n at a specific time point or based on a specific periodicity, and RA server 2 is indicated to send a challenge request to network device 1, network device 2, and network device n at the specific time point. Each RA server performs integrity attestation on a corresponding measurement object in a corresponding network device, to complete integrity attestation in a specific device range. In addition, a plurality of RA servers calculates measurement results of measurement objects corresponding to a plurality of network devices in a distributed manner, especially in a case in which measurement tasks of each single network device are heavy. This resolves a resource limitation problem caused by one RA server calculating measurement results of a plurality of network devices, and overcomes a resource bottleneck.

In a second scenario, it is assumed that the remote attestation policy in the measurement task includes the first and the fifth items. In this case, each RA server sends, at a specific time point based on resource usage or availability of the RA server and a time point or a time sequence rule specified in the remote attestation policy, a challenge request to any network device in the remote attestation system.

In an example, as shown in FIG. 5, if currently available resources of RA server 1 are very insufficient, the primary RA server is notified that RA server 1 can be responsible for remote attestation on integrity of measurement objects 1 in only some network devices. In this case, for remote attestation on integrity of measurement objects 1 in network devices that exceed a quantity range, another RA server needs to be arranged to perform remote attestation, so that a resource load balancing capability and remote attestation efficiency of the entire system can be improved.

It should be understood that, in actual application, different policy combinations may be selected based on different scenarios, to maximize remote attestation efficiency and reliability.

Step 620. Obtain a measurement value.

When receiving an integrity challenge request from the RA server, an RA client in each network device obtains an integrity measurement value of a corresponding measurement object stored in a TPM chip. In this implementation, after each network device receives the challenge request sent by corresponding RA server 1, the network device obtains the measurement value of measurement object 1 in the network device. After each network device receives the challenge request sent by corresponding RA server 2, the network device obtains the measurement value of measurement object 2 in the network device. For an implementation process, refer to processing of corresponding similar parts in step 120, step 220, step 320, step 420, and step 520 in the foregoing embodiments.

Step 630. Send a measurement report.

As described above, in a traffic distribution implementation, the primary RA server or the network management device sends a measurement task to each RA server, to indicate each RA server to send, based on the measurement task, a challenge request to a corresponding measurement object in a network device for which each RA server is responsible, and then each network device sends a measurement report to the RA server that sends the challenge request. In this embodiment, RA server 1 sends the challenge request to measurement object 1 in each network device based on the measurement task, and RA server 2 sends the challenge request to measurement object 2 in each network device based on the measurement task. The measurement report sent by each network device to RA server 1 carries the measurement value of measurement object 1 in the network device, and the measurement report sent by each network device to RA server 2 carries the measurement value of measurement object 2 in the network device.

For a process, refer to processing of corresponding similar parts in step 130, step 230, step 330, step 430, and step 530 in the foregoing embodiments.

Step 640. Download a baseline measurement value. For an implementation, refer to processing of corresponding similar parts in step 240, step 340, step 440, and step 540 in the foregoing embodiments.

Step 645. Distribute a baseline measurement value. After obtaining a baseline measurement value of a measurement object in each network device from a support website, the primary RA server or the network management device distributes a baseline measurement value of measurement object 1 in each network device to each RA server 1, and distributes a baseline measurement value of measurement object 2 in each network device to each RA server 2. It may be understood that, in another implementation, the primary RA server may alternatively distribute a baseline measurement value of a measurement object in each network device to each RA server. A specific distribution manner is related to remote attestation on integrity of specific measurement objects in specific network devices for which each RA server is responsible. That is, the primary RA server or the network management device may separately send baseline measurement values of measurement objects in different network devices to different RA servers in the manner of distributing the measurement task in the step 615. It may be understood that the baseline measurement value of the measurement object in step 645 may be carried in the measurement task in the step 615 for distribution.

Step 650. Calculate a measurement result. Each RA server performs remote attestation on integrity of a corresponding measurement object in the network device. In this embodiment, RA server 1 performs remote attestation on integrity of measurement object 1 in each network device, and RA server 2 performs remote attestation on integrity of measurement object 2 in each network device.

Step 660. Send a measurement result. RA server 1 sends an attestation result of remote attestation on integrity of measurement object 1 in each network device to the primary RA server or the network management device, and RA server 2 sends an attestation result of remote attestation on integrity of measurement object 2 in each network device to the primary RA server or the network management device.

Step 670. Calculate network-wide integrity. The primary RA server or the network management device performs device integrity attestation on each network device and/or remote attestation on network-wide integrity.

For implementations of the foregoing step 650 to step 670, refer to detailed descriptions of corresponding similar processing processes in FIG. 2 to FIG. 5. Details are not described herein again.

In the remote attestation system provided in the embodiment in FIG. 6, a plurality of RA servers is deployed in a distributed manner to perform load balancing, so that not only software integrity during startup can be measured, but also file integrity during running can be measured. This meets both integrity attestation requirements of a large quantity of files in a running process of a network device and coexistence of a plurality of measurement requirements, and provides reliable integrity attestation.

Figure 7:
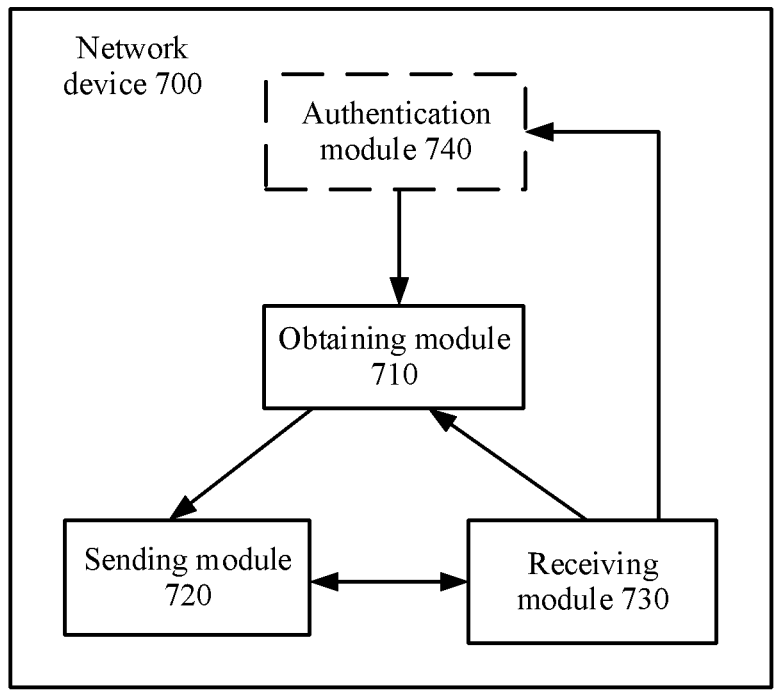
FIG. 7 is a schematic diagram of an architecture of a network device according to an embodiment of this application.

FIG. 7 shows a network device 700 in a remote attestation system according to an embodiment of this application. The network device 700 is one of the at least one network device. If there are a plurality of network devices in the remote attestation system, the plurality of network devices has a same function as the network device 700. The network device may be a routing device, a switch device, a firewall, or another device in a communication network. The network device 700 shown in FIG. 7 may be applied to the following two implementation scenarios. In a first real-time scenario, when the network device 700 is mainly the network device in the embodiments shown in FIG. 1 to FIG. 4 and FIG. 6, the remote attestation system in this scenario includes a plurality of RA servers and at least one network device. The network device 700 includes the following modules: an obtaining module 710, configured to obtain integrity measurement values of a plurality of measurement objects in the network device, where for an implementation process of obtaining the measurement values, refer to detailed descriptions in step 120, step 220, step 320, step 420, and step 620 in the embodiments shown in FIG. 1 to FIG. 4 and FIG. 6, and details are not described herein again; and a sending module 720, configured to separately send integrity measurement values of different measurement objects in the integrity measurement values of the plurality of measurement objects to at least two RA servers in the plurality of RA servers, so that the at least two RA servers separately perform remote attestation on integrity of the different measurement objects in the network device. For an implementation process of sending the measurement values, refer to detailed descriptions in step 130, step 230, step 330, step 430, and step 630 in the embodiments shown in FIG. 1 to FIG. 4 and FIG. 6, and details are not described herein again.

Optionally, the network device further includes a receiving module 730, configured to receive an integrity challenge request. For an implementation process of receiving the integrity challenge request, refer to detailed descriptions in step 120, step 220, step 320, step 325, step 420, and step 620 in the embodiments shown in FIG. 1 to FIG. 4 and FIG. 6, and details are not described herein again.

Optionally, the network device further includes an authentication module 740, configured to perform authentication on a sender that sends the integrity challenge request; and after the authentication succeeds, indicate the obtaining module to obtain the integrity measurement values of the plurality of measurement objects in the network device. For an implementation process of the authentication module 740, refer to detailed descriptions in step 120, step 220, step 320, step 420, and step 620 in the embodiments shown in FIG. 1 to FIG. 4 and FIG. 6, and details are not described herein again.

It should be noted that, during an implementation, the obtaining module 710, the sending module 720, the receiving module 730, and the authentication module 740 are disposed in an RA client in the network device 700, and the network device 700 further includes a trusted platform module TPM chip configured to store the integrity measurement values of the measurement objects in the network device 700. The obtaining module 710 obtains the integrity measurement values of the measurement objects from the TPM chip.

In a specific example, the measurement objects in the network device 700 include a BIOS, an OS, one or more APPs, and one or more files, where the one or more files are stored in the TPM chip in the running process of the network device.

In another embodiment, the RA client in the network device 700 includes a first RA client and a second RA client, and the obtaining module 710, the sending module 720, the receiving module 730, and the authentication module 740 are disposed in both the first RA client and the second RA client. The measurement object in the network device 700 includes a BIOS, an OS, one or more APPs, one or more files, and one or more VMs, the one or more files are stored in the TPM chip in the running process of the network device, and each of the one or more VMs includes one first RA client.

For detailed processing processes of the modules in the network device 700, refer to the detailed descriptions of the corresponding steps in the embodiments shown in FIG. 1 to FIG. 4 and FIG. 6. Details are not described herein again.

In a second implementation scenario to which the network device 700 shown in FIG. 7 is applied, the network device 700 is mainly the network device in the embodiment shown in FIG. 5. The obtaining module 710 is configured to obtain an integrity measurement value of a measurement object in the network device. The sending module 720 is configured to send the integrity measurement value of the measurement object to at least one first RA server in the plurality of first RA servers, so that the at least one first RA server performs remote attestation on integrity of the measurement object in the network device. The receiving module 730 is configured to receive an integrity challenge request sent by one or more first RA servers in the plurality of first RA servers. The authentication module 740 is configured to perform authentication on a sender that sends the integrity challenge request; and after the authentication succeeds, indicate the obtaining module to obtain the integrity measurement value of the measurement object in the network device. For an implementation process of the foregoing processing, refer to the detailed descriptions of corresponding steps in the embodiments shown in FIG. 1, FIG. 2, and FIG. 5. Details are not described herein again.

For detailed processing processes of the modules in the network device 700, refer to the detailed descriptions of the corresponding steps in the embodiment shown in FIG. 5. Details are not described herein again. It may be understood that the network device 700 in this implementation scenario may be applied to each network device in the embodiment shown in FIG. 6, and may process integrity attestation on a measurement object in a running process of the network device. For an implementation process, refer to the detailed descriptions of steps in the embodiment shown in FIG. 6.

Figure 8:
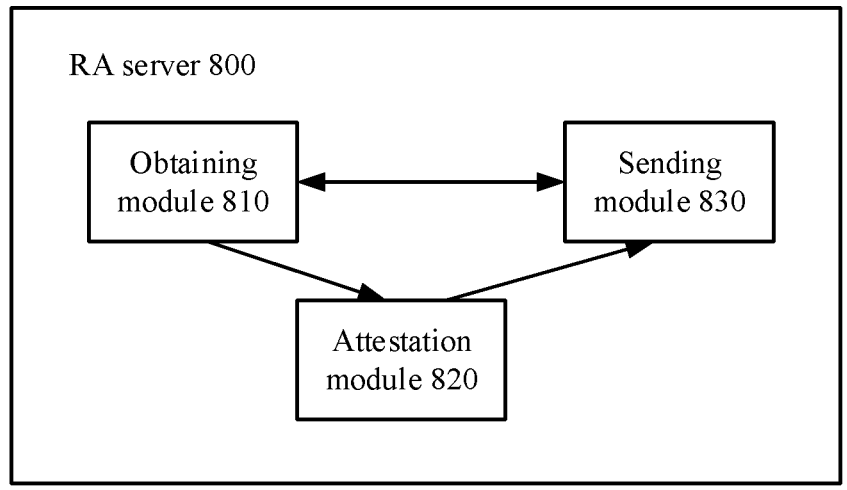
FIG. 8 is a schematic diagram of an architecture of an RA server according to an embodiment of this application.

FIG. 8 shows an RA server 800 in a remote attestation system according to an embodiment of this application. The RA server 800 shown in FIG. 8 may be applied to two implementation scenarios. In a first implementation scenario, the RA server 800 is the first RA server in the embodiments shown in FIG. 1 to FIG. 4 and FIG. 6. As shown in FIG. 1 to FIG. 4 and FIG. 6, the remote system to which the RA server 800 is applied includes a plurality of RA servers and at least one network device, where each of the at least one network device includes a plurality of measurement objects, the RA server is one of the plurality of RA servers, and the plurality of RA servers further include a primary RA server. The RA server 800 includes the following modules: an obtaining module 810, configured to obtain integrity measurement values of some measurement objects in a first network device, where the first network device is a network device in the at least one network device; and for an implementation process of obtaining the integrity measurement values of the some measurement objects in the first network device, refer to the detailed descriptions in step 130, step 230, step 330, step 335, step 430, and step 630 in the foregoing embodiments shown in FIG. 1 to FIG. 4 and FIG. 6, and details are not described herein again; and an attestation module 820, configured to perform remote attestation on integrity of the some measurement objects in the first network device based on the integrity measurement values of the some measurement objects in the first network device. For an implementation process of the remote attestation, refer to the detailed descriptions in step 150, step 250, step 350, step 450, and step 650 in the embodiments shown in FIG. 1 to FIG. 4 and FIG. 6, and details are not described herein again.

Optionally, the RA server 800 further includes a sending module 830, configured to send an integrity challenge request to the first network device. For an implementation process, refer to the detailed descriptions in step 120, step 220, step 320, step 325, step 420, and step 620 in the embodiments shown in FIG. 1 to FIG. 4 and FIG. 6, and details are not described herein again.

Optionally, the sending module 830 may be further configured to send an attestation result of remote attestation on integrity of some measurement objects in the first network device to a second RA server or a network management device, so that the second RA server or the network management device performs remote attestation on device integrity of the first network device, where the second RA server is the primary RA server in the plurality of RA servers. For an implementation process, refer to the detailed descriptions in step 260, step 360, step 460, and step 660 in the embodiments shown in FIG. 2 to FIG. 4 and FIG. 6, and details are not described herein again.

Optionally, the obtaining module 810 is further configured to obtain a measurement task sent by the primary RA server or the network management device, where the measurement task includes a remote attestation policy. For an implementation process, refer to the detailed descriptions in step 315 and step 615 in the embodiments shown in FIG. 3A and FIG. 3B and FIG. 6. Details are not described herein again.

Optionally, the obtaining module 810 is configured to obtain the integrity measurement values that are of some measurement objects in the first network device and that are sent by the primary RA server or the network management device according to the remote attestation policy. For an implementation process, refer to the detailed descriptions in step 345 in the foregoing embodiment shown in FIG. 3A and FIG. 3B. Details are not described herein again.

Optionally, the obtaining module 810 is further configured to obtain an integrity baseline measurement value of a measurement object in each network device. For an implementation process, refer to the detailed descriptions in step 140, step 240, step 340, step 440, and step 640 in the embodiments shown in FIG. 1 to FIG. 4 and FIG. 6, and details are not described herein again.

Optionally, the obtaining module 810 is further configured to receive an attestation result, sent by each of other RA servers in the plurality of RA servers, of remote attestation on integrity of some measurement objects in the first network device. The attestation module 820 is further configured to perform remote attestation on device integrity of the first network device based on the attestation result. Alternatively, the obtaining module 810 is further configured to receive an attestation result, sent by each of other RA servers in the plurality of RA servers, of remote attestation on integrity of some measurement objects in other network devices in the at least one network device. The attestation module 820 is further configured to perform remote attestation on network-wide integrity based on the attestation result. For an implementation process of the attestation process, refer to the detailed descriptions in step 270 in the embodiment shown in FIG. 2, and step 370, step 470, and step 670 in FIG. 3A and FIG. 3B, FIG. 4, and FIG. 6. Details are not described herein again.

Optionally, the RA server 800 may further include a management and presentation module (not shown in FIG. 8), configured to manage and present the attestation result. For an implementation, refer to the descriptions of a corresponding part, for example, step 250, in the embodiment shown in FIG. 2.

For detailed processing processes of the modules in the RA server 800, refer to the detailed descriptions of the corresponding steps in the embodiments shown in FIG. 1 to FIG. 4 and FIG. 6. Details are not described herein again.

In a second implementation scenario to which the RA server 800 shown in FIG. 8 is applied, the RA server 800 is mainly the first RA server in the embodiment shown in FIG. 5. As shown in FIG. 5, the remote system to which the RA server 800 is applied includes a plurality of RA servers and a plurality of network devices. The RA server is a first RA server in the plurality of RA servers, and the obtaining module 810, the attestation module 820, and the sending module 830 included in the RA server 800 separately perform the following processing.

The obtaining module 810 is configured to obtain an integrity measurement value of a measurement object in each network device in a first network device set, where the first network device set includes at least one network device. For an implementation process of obtaining the integrity measurement value of the measurement object in each network device in the first network device set, refer to the detailed descriptions in step 530 and step 535 in the embodiment shown in FIG. 5. Details are not described herein again.

The attestation module 820 is configured to perform remote attestation on integrity of the measurement object in each network device in the first network device set based on the integrity measurement value of the measurement object in each network device in the first network device set. For an implementation process of the attestation, refer to the detailed descriptions in step 550 in the embodiment shown in FIG. 5. Details are not described herein again.

Optionally, the obtaining module 810 is configured to obtain the integrity measurement value that is of the measurement object in each network device in the first network device set and that is sent by the primary RA server or the network management device according to the remote attestation policy. For an implementation process, refer to the detailed descriptions in step 555 in the embodiment shown in FIG. 5. Details are not described herein again.

Optionally, the RA server 800 further includes a sending module 830 configured to send an attestation result of remote attestation on integrity of the measurement object in each network device in the first network device set to a second RA server or a network management device, so that the second RA server or the network management device performs remote attestation on network-wide integrity, where the second RA server is a primary RA server in the plurality of RA servers. For an implementation process, refer to the detailed descriptions in step 560 in the foregoing embodiment shown in FIG. 5. Details are not described herein again.

Optionally, the obtaining module 810 is further configured to receive a measurement task sent by the primary RA server or the network management device, where the measurement task includes a remote attestation policy. The sending module is configured to send the integrity challenge request to each network device in the first network device set according to the remote attestation policy. For an implementation process, refer to the detailed descriptions in step 515 in the foregoing embodiment shown in FIG. 5. Details are not described herein again.

Optionally, the obtaining module 810 is further configured to obtain an integrity baseline measurement value of the measurement object in each network device in the first network device set. For an implementation process, refer to the detailed descriptions in step 540 in the foregoing embodiment shown in FIG. 5. Details are not described herein again.

Optionally, the RA server 800 may further include a management and presentation module (not shown in FIG. 8), configured to manage and present the attestation result. For an implementation, refer to the descriptions of a corresponding part, for example, step 250, in the embodiment shown in FIG. 2.

For detailed processing processes of the modules in the RA server 800, refer to the detailed descriptions of the corresponding steps in the embodiment shown in FIG. 5. Details are not described herein again.

It may be understood that the RA server 800 in this implementation scenario may be applied to each RA server in the embodiment shown in FIG. 6, and may process integrity attestation on a measurement object in a running process of the network device. For an implementation process, refer to the detailed descriptions of steps in the embodiment shown in FIG. 6.

Figure 9:
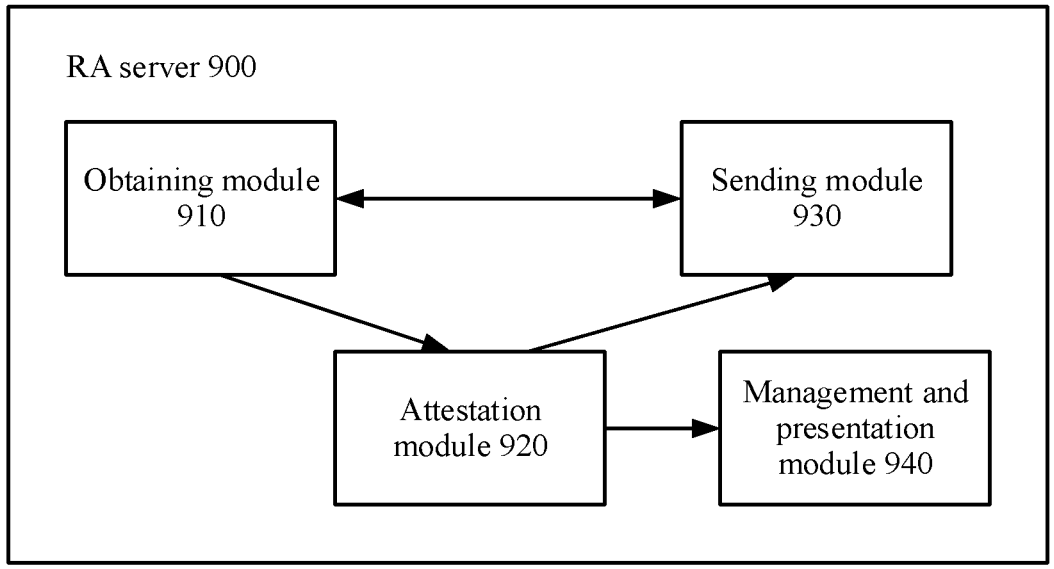
FIG. 9 is a schematic diagram of an architecture of an RA server according to an embodiment of this application.

FIG. 9 shows an RA server 900 in a remote attestation system according to an embodiment of this application. The RA server 900 shown in FIG. 9 may be applied to the following two implementation scenarios. In a first implementation scenario, the RA server 900 is the primary RA server in the embodiments shown in FIG. 1 to FIG. 4 and FIG. 6. As shown in FIG. 1 to FIG. 4 and FIG. 6, the remote system to which the RA server 900 is applied includes a plurality of RA servers and at least one network device. Each of the at least one network device includes a plurality of measurement objects, the plurality of RA servers include a plurality of first RA servers and one second RA server, the RA server 900 is a primary RA server, and the RA server 900 includes the following modules such as an obtaining module 910 configured to obtain an attestation result, sent by each of the plurality of first RA servers, of remote attestation performed by each first RA server on integrity of some measurement objects in a first network device, where the first network device is a network device in the at least one network device. For an implementation process, refer to the detailed descriptions in step 260, step 360, step 460, and step 660 in the embodiments shown in FIG. 2 to FIG. 4 and FIG. 6, and details are not described herein again. An attestation module 920 is configured to perform remote attestation on device integrity of a plurality of measurement objects in the first network device based on the attestation result. For an implementation process of the attestation process, refer to the detailed descriptions in step 270 in the embodiment shown in FIG. 2, and step 370, step 470, and step 670 in FIG. 3A and FIG. 3B, FIG. 4, and FIG. 6. Details are not described herein again.

Optionally, the obtaining module 910 is further configured to obtain integrity baseline measurement values of the plurality of measurement objects in the first network device. The RA server further includes a sending module 930, configured to send the integrity baseline measurement values of the plurality of measurement objects in the first network device to each first RA server, or send integrity baseline measurement values of some measurement objects in the first network device to each first RA server. For an implementation process, refer to the detailed descriptions in step 140, step 240, step 340, step 440, and step 640 in the embodiments shown in FIG. 1 to FIG. 4 and FIG. 6, and details are not described herein again.

Optionally, the obtaining module 910 is further configured to receive an attestation result, sent by each of the plurality of first RA servers, of remote attestation performed by each first RA server on integrity of some measurement objects in other network devices in the plurality of network devices. For an implementation process, refer to the detailed descriptions in step 260, step 360, step 460, and step 660 in the embodiments shown in FIG. 2 to FIG. 4 and FIG. 6, and details are not described herein again. Correspondingly, the attestation module 920 is further configured to perform remote attestation on network-wide integrity of the plurality of network devices based on the attestation result. For an implementation process of the attestation process, refer to the detailed descriptions in step 270 in the embodiment shown in FIG. 2, and step 370, step 470, and step 670 in FIG. 3A and FIG. 3B, FIG. 4, and FIG. 6. Details are not described herein again.

Optionally, the sending module 930 is further configured to send a measurement task to each first RA server, where the measurement task includes a remote attestation policy, to indicate each first RA server to send an integrity challenge request to a corresponding network device in the plurality of network devices according to the remote attestation policy. For an implementation process, refer to the detailed descriptions in step 315 in the foregoing embodiment shown in FIG. 3A and FIG. 3B. Details are not described herein again.

Optionally, the obtaining module 910 is further configured to receive the integrity measurement values that are of the plurality of measurement objects in each of the plurality of network devices and that are sent by each of the plurality of network devices. For an implementation process, refer to the detailed descriptions in step 335 in the foregoing embodiment shown in FIG. 3A and FIG. 3B. Details are not described herein again. Correspondingly, the sending module 930 is further configured to separately send the integrity measurement values of the plurality of measurement objects in the network devices to some or all of the plurality of first RA servers according to the remote attestation policy, to indicate the some or all of the plurality of first RA servers to perform remote attestation on integrity of some measurement objects in the plurality of measurement objects in the corresponding network devices. For an implementation process, refer to the detailed descriptions in step 345 in the foregoing embodiment shown in FIG. 3A and FIG. 3B. Details are not described herein again.

Optionally, the RA server 900 further includes a management and presentation module 940, where the management and presentation module is configured to manage and present a result of the remote attestation. For an implementation, refer to the descriptions of a corresponding part, for example, step 250, in the embodiment shown in FIG. 2.

Optionally, the obtaining module 910 is further configured to obtain integrity measurement values of some measurement objects in the first network device. For an implementation process, refer to the detailed descriptions in step 260 in the foregoing embodiment shown in FIG. 2. Details are not described herein again. Correspondingly, the attestation module 940 is further configured to perform remote attestation on integrity of some measurement objects in the first network device based on the integrity measurement values of some measurement objects in the first network device. For an implementation process, refer to the detailed descriptions in step 270 in the foregoing embodiment shown in FIG. 2. Details are not described herein again.

In a second implementation scenario to which the RA server 900 shown in FIG. 9 is applied, the RA server 900 is mainly the primary RA server in the embodiment shown in FIG. 5. As shown in FIG. 5, the remote system to which the RA server 900 is applied includes a plurality of RA servers and a plurality of network devices. The plurality of RA servers includes a plurality of first RA servers and one second RA server, the RA server 900 is the second RA server, and the second RA server is a primary RA server. The obtaining module 910, the attestation module 920, and the sending module 930 in the RA server 900 separately perform the following processing.

The obtaining module 910 is configured to obtain an attestation result that is of remote attestation performed by each first RA server on integrity of a measurement object in a corresponding network device and that is sent by some or all of the plurality of first RA servers separately. For an implementation process, refer to the detailed descriptions in step 560 in the foregoing embodiment shown in FIG. 5. Details are not described herein again. Correspondingly, the attestation module 920 is configured to perform remote attestation on network-wide integrity based on the attestation result. For an implementation process, refer to the detailed descriptions in step 570 in the foregoing embodiment shown in FIG. 5. Details are not described herein again.

Optionally, the RA server 900 further includes a sending module 930, where the sending module is configured to send the integrity baseline measurement value of the measurement object in each network device to each first RA server, or separately send integrity baseline measurement values of measurement objects in some of the plurality of network devices to some of the plurality of first RA servers. For an implementation process, refer to the detailed descriptions in step 545 in the foregoing embodiment shown in FIG. 5. Details are not described herein again.

Optionally, the sending module 930 is further configured to send a measurement task to each first RA server, where the measurement task includes a remote attestation policy, and each first RA server sends an integrity challenge request to a corresponding network device according to the remote attestation policy. For an implementation process, refer to the detailed descriptions in step 515 in the foregoing embodiment shown in FIG. 5. Details are not described herein again.

Optionally, the sending module 930 is further configured to send an integrity challenge request to all or some of the plurality of network devices. For an implementation process, refer to the detailed descriptions in step 525 in the foregoing embodiment shown in FIG. 5. Details are not described herein again. Correspondingly, the obtaining module 910 is further configured to receive an integrity measurement value that is of the measurement object in each of the plurality of network devices and that is sent by the network device. For an implementation process, refer to the detailed descriptions in step 535 in the foregoing embodiment shown in FIG. 5. Details are not described herein again. Correspondingly, the sending module 930 is further configured to separately send the integrity measurement value of the measurement object in each network device to some or all of the plurality of first RA servers according to a remote attestation policy, to indicate the some or all of the plurality of first RA servers to perform remote attestation on integrity of a measurement object in a corresponding network device. For an implementation process, refer to the detailed descriptions in step 555 in the foregoing embodiment shown in FIG. 5. Details are not described herein again.

Optionally, the RA server 900 further includes a management and presentation module 940, where the management and presentation module 940 is configured to manage and present a result of the remote attestation. For an implementation, refer to the descriptions of a corresponding part, for example, step 250, in the embodiment shown in FIG. 2.

It may be understood that the RA server 900 in this implementation scenario may be applied to the RA server in the embodiment shown in FIG. 6, and may process integrity attestation on a measurement object in a running process of the network device. For an implementation process, refer to the detailed descriptions of steps in the embodiment shown in FIG. 6.

Figure 10:
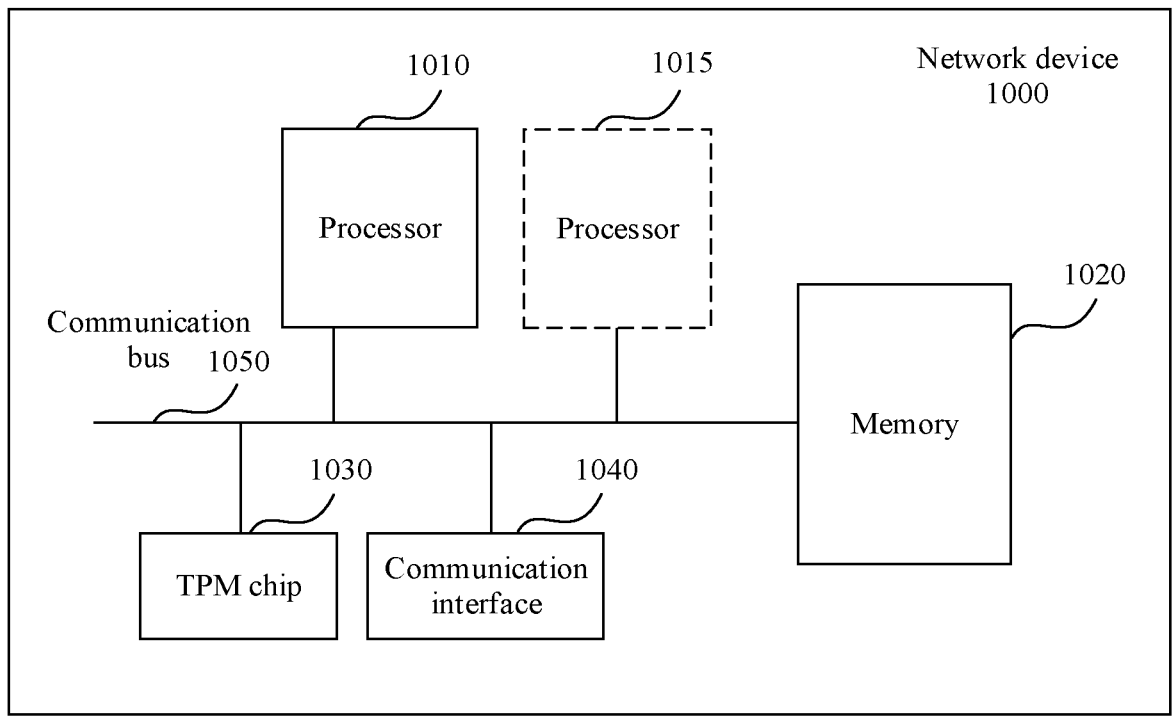
FIG. 10 is a schematic diagram of an architecture of another network device according to an embodiment of this application.

FIG. 10 is a schematic diagram of a structure of a network device 1000 in a remote attestation system according to an embodiment of this application. The network device in the embodiments shown in FIG. 1 to FIG. 6 may be implemented by the network device 1000 shown in FIG. 10. The network device 1000 may be a switch, a router, a firewall, or a network device in another communication network. Refer to FIG. 10. The network device 1000 includes at least one processor 1010, a TPM chip 1030, a communication bus 1050, a memory 1020, and at least one communication interface 1040.

The processor 1010 may be a general-purpose central processing unit (CPU), an application-specific integrated circuit (ASIC), or one or more integrated circuits for controlling program execution of the solutions of this application.

The communication bus 1050 may include a path for information transfer between the foregoing components.

The memory 1020 may be a read-only memory (ROM) or another type of static storage device that can store static information and instructions, or a random access memory (RAM) or another type of dynamic storage device that can store information and instructions. The memory 1020 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer. However, the memory 1020 is not limited thereto. The memory 1020 may exist independently and is connected to the processor 1010 via the communication bus 1050. Alternatively, the memory 1020 may be integrated with the processor 1010.

The memory 1020 is configured to store program code, and the processor 1010 controls execution of the program code, to perform the processing steps performed by the network device in any embodiment in FIG. 1 to FIG. 6. The processor 1010 is configured to execute the program code stored in the memory 1020. The program code may include one or more software modules. The one or more software modules may be the software modules provided in the embodiment in FIG. 7.

The communication interface 1040 is configured to communicate with another device or a communication network such as the Ethernet, a radio access network (RAN), or a wireless local area network (WLAN) via any apparatus such as a transceiver.

During an implementation, in an embodiment, the network device 1000 may include a plurality of processors, for example, the processor 1010 and a processor 1015 that are shown in FIG. 10. Each of these processors may be a single-core (single-CPU) processor, or may be a multi-core (multi-CPU) processor. The processor herein may be one or more devices or circuits, and/or processing cores configured to process data (for example, computer program instructions).

Figure 11:
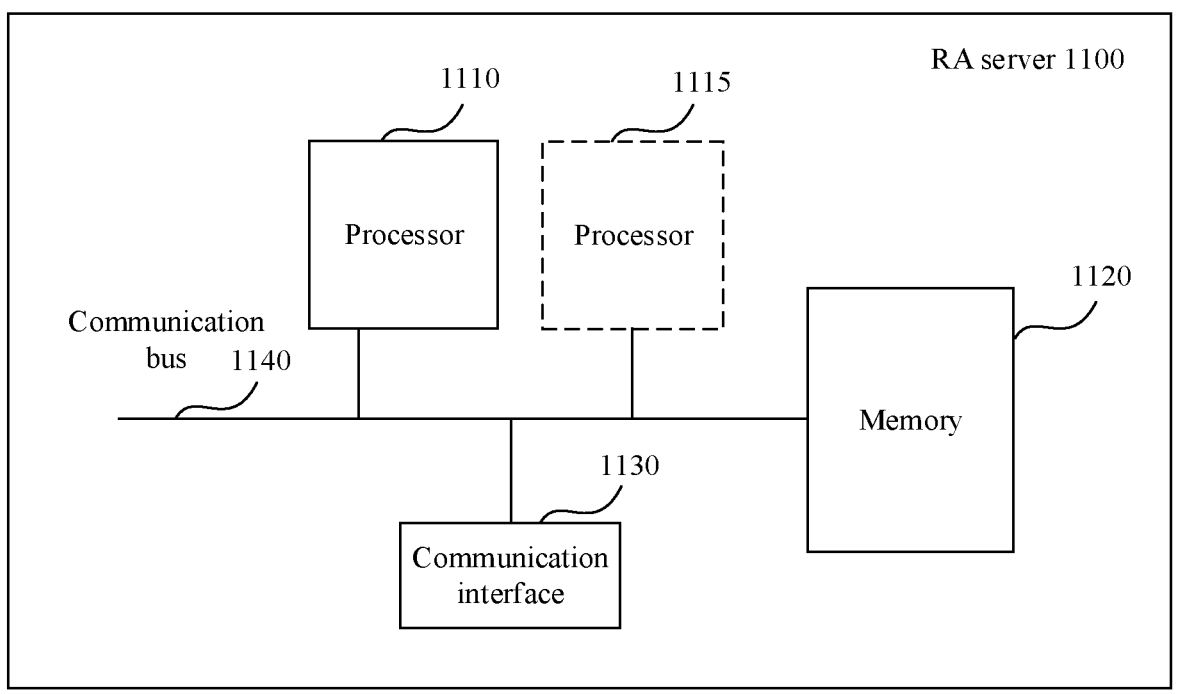
FIG. 11 is a schematic diagram of an architecture of another RA server according to an embodiment of this application.

FIG. 11 is a schematic diagram of a structure of an RA server 1100 in a remote attestation system according to an embodiment of this application. All the RA servers in the embodiments shown in FIG. 1 to FIG. 6, including the primary RA server, may be implemented by the RA server 1100 shown in FIG. 11. Refer to FIG. 11. The RA server 1100 includes at least one processor 1110, a communication bus 1140, a memory 1120, and at least one communication interface 1130.

The processor 1010 may be a general-purpose CPU, an ASIC, or one or more integrated circuits for controlling program execution of the solutions of this application.

The communication bus 1140 may include a path for information transfer between the foregoing components.

The memory 1120 may be a ROM or another type of static storage device that can store static information and instructions, or a RAM or another type of dynamic storage device that can store information and instructions. The memory 1120 may alternatively be an EEPROM, a CD-ROM or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer. However, the memory 1120 is not limited thereto. The memory 1120 may exist independently and is connected to the processor 1110 via the communication bus 1140. Alternatively, the memory 1120 may be integrated with the processor 1110.

The memory 1120 is configured to store program code, and the processor 1110 controls execution of the program code, to perform processing steps performed by the RA servers, including the primary RA server, in any embodiment in FIG. 1 to FIG. 6. The processor 1110 is configured to execute the program code stored in the memory 1120. The program code may include one or more software modules. The one or more software modules may be the software modules provided in the embodiment in FIG. 8 or FIG. 9.

The communication interface 1140 is configured to communicate with another device or a communication network such as the Ethernet, a RAN, or a WLAN via any apparatus such as a transceiver.

During an implementation, in an embodiment, the RA server 1100 may include a plurality of processors, for example, the processor 1110 and a processor 1115 that are shown in FIG. 11. Each of these processors may be a single-core (single-CPU) processor, or may be a multi-core (multi-CPU) processor. The processor herein may be one or more devices or circuits, and/or processing cores configured to process data (for example, computer program instructions).

All or some of the foregoing embodiments may be implemented by software, hardware, firmware, or any combination thereof. When the software is used for implementation, all or some of embodiments may be implemented in a form of a computer program product. The computer program product includes one or more computer instructions. When the computer instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A remote attestation method, implemented by a network device of a plurality of network devices, wherein the remote attestation method comprises:

obtaining integrity measurement values of measurement objects in the network device based on a plurality of integrity challenge requests of a plurality of remote attestation (RA) servers, wherein at least two of the integrity measurement objects are associated with separate RA servers; and separately sending, in response to the integrity challenge requests, each integrity measurement value of the integrity measurement values to a different RA server of the RA servers that sent an integrity challenge request to enable the different RA servers to perform remote attestation on integrity of a corresponding measurement object of the measurement objects, wherein each integrity measurement value sent is of a different measurement object.

2. The remote attestation method of claim 1, wherein the RA servers comprise a plurality of first RA servers and one second RA server, and wherein the remote attestation method further comprises receiving the integrity challenge requests from at least one of the first RA servers, wherein obtaining the integrity measurement values comprises obtaining the integrity measurement values of the measurement objects in the network device in response to the integrity challenge requests, and wherein separately sending the integrity measurement values comprises separately sending the integrity measurement values to the at least one first RA servers.

3. The remote attestation method of claim 1, wherein the RA servers comprise a plurality of first RA servers and one second RA server, wherein the second RA server is a primary RA server, and wherein the remote attestation method further comprises receiving a second integrity challenge request from the primary RA server, wherein the obtaining comprises obtaining the integrity measurement values of the measurement objects in the network device, wherein sending the integrity measurement values comprises sending second integrity measurement values to the primary RA server in response to the second integrity challenge request to enable the primary RA server to send the second integrity measurement values to one of the first RA servers according to a remote attestation policy, wherein the remote attestation policy instructs one of the first RA servers to perform remote attestation on an integrity of the measurement objects, and wherein the remote attestation policy comprises at least one of:

a time sequence relationship of remote attestation on an integrity of a corresponding measurement object in each of a plurality of network devices;

a correspondence between each of the first RA servers and a measurement object on which the first RA server can perform remote attestation;

a relationship between each of the first RA server and a range of devices measured by the first RA server;

a relationship between each of the first RA servers and a range of measurement objects measured by the first RA server; or usage or availability of a dynamic resource of each of the first RA servers.

4. The remote attestation method of claim 2, wherein receiving the integrity challenge request from at least one of the first RA servers comprises receiving the integrity challenge requests from the at least one of the first RA servers according to a remote attestation policy, wherein the remote attestation policy comprises at least one of:

an instruction to each of the first RA servers to send an integrity challenge request at a specific time point;

an instruction to each of the first RA servers to send an integrity challenge request based on a correspondence between the first RA servers and a first measurement object on which the first RA servers can perform remote attestation;

an instruction to each of the first RA servers to send an integrity challenge request based on a range of devices measured by the first RA servers;

an instruction to each of the first RA servers to send an integrity challenge request based on a range of measurement objects measured by the first RA servers; or an instruction to each of the first RA servers to send an integrity challenge request based on usage of a dynamic resource of the first RA servers or availability of the dynamic resource.

5. The remote attestation method of claim 1, wherein the network device comprises an RA client and a trusted platform module (TPM) chip, wherein obtaining the integrity measurement values comprises obtaining, by a RA client in the network device, the integrity measurement values from the TPM chip in the network device, wherein the integrity measurement values are stored in the TPM chip in a startup process of the network device or a running process of the network device, and wherein sending comprises sending, by the RA client, the integrity measurement values to the at least one of the RA servers.

6. The remote attestation method of claim 5, wherein the measurement objects comprise a basic input/output system (BIOS), an operating system (OS), one or more applications (APPs), and one or more files, wherein the one or more files are stored in the TPM chip in the running process of the network device, and wherein the remote attestation method further comprises separately sending, by the RA client in the network device, the integrity measurement values of the BIOS, the OS, the one or more APPS, and the one or more files to different RA servers when sending the integrity measurement values to at least one of the RA servers.

7. The remote attestation method of claim 5, wherein the RA client comprises a first RA client and a second RA client, wherein the measurement objects comprise a basic input/output system (BIOS), an operating system (OS), one or more applications (APPs), one or more files, and one or more virtual machines (VMs), wherein the one or more files are stored in the TPM chip in the running process of the network device, wherein each of the one or more VMs comprises one first RA client, and wherein sending, by the RA client, the integrity measurement values to at least one of the RA servers comprises:

sending, by the one first RA client, an integrity measurement value of a corresponding VM to an RA server that corresponds to a VM of the VMs; and sending, by the second RA client, an integrity measurement value of another measurement object of other than the one or more VMs to an RA server corresponding to the another measurement object other than the one or more VMs.

8. A remote attestation method implemented by a first remote attestation (RA) server, wherein the remote attestation method comprises:

sending an integrity challenge request to each network device of a plurality of network devices in a first network device set, wherein at least two of the integrity measurement objects are associated with separate RA servers, and wherein the integrity challenge request comprises an identifier of the first RA server that sent the integrity challenge request;

obtaining, based on the integrity challenge request to each of the network devices, an integrity measurement value of a corresponding measurement object in each of the network devices directly from each of the network devices, wherein the corresponding measurement object is associated with the identifier of the first RA server, and wherein each integrity measurement value sent is of a different measurement object; and performing, remote attestation on an integrity of the corresponding measurement object based on the integrity measurement value of the corresponding measurement object.

9. The remote attestation method of claim 8, wherein obtaining the integrity measurement value comprises receiving, according to a remote attestation policy, the integrity measurement value that is of the corresponding measurement object, and wherein the remote attestation policy comprises at least one of:

a time sequence relationship of remote attestation on an integrity of a measurement object in each of the network devices;

a correspondence between the first RA server and a measurement object on which the first RA server can perform remote attestation;

a relationship between the first RA server and a range of devices measured by the first RA server;

a relationship between the first RA server and a range of measurement objects measured by the first RA server; or usage or availability of a dynamic resource of the first RA server.

10. The remote attestation method of claim 8, further comprising sending an attestation result of the remote attestation on the integrity of the corresponding measurement object in each of the network devices in the first network device set to a second RA server or a network management device to enable the second RA server or the network management device to perform a second remote attestation on network-wide integrity, wherein the second RA server is a primary RA server in the RA servers.

11. The remote attestation method of claim 10, further comprising receiving a measurement task from the second RA server or the network management device, wherein the measurement task comprises a remote attestation policy, wherein sending the integrity challenge request comprises sending the integrity challenge request according to the remote attestation policy, and wherein the remote attestation policy comprises at least one of:

an instruction to the first RA server to send an integrity challenge request at a specific time point;

an instruction to a range of devices to which the first RA server sends an integrity challenge request;

an instruction to a range of measurement objects for which the first RA server sends an integrity challenge request; or an instruction to the first RA server to send an integrity challenge request when usage or availability of a dynamic resource of the first RA server meets a condition.

12. The remote attestation method of claim 8, further comprising obtaining an integrity baseline measurement value of the corresponding measurement object, and wherein performing the remote attestation on the integrity of the corresponding measurement object comprises:

comparing the integrity measurement value of the corresponding measurement object with the integrity baseline measurement value of the corresponding measurement object; and determining that remote attestation on integrity of the corresponding measurement object in each of the network devices in the first network device set succeeds when the integrity measurement value of the corresponding measurement object is same as the integrity baseline measurement value of the corresponding measurement object.

13. A network device in a remote attestation system, wherein the network device comprises:

a memory configured to store instructions; and a processor coupled to the memory and configured to execute the instructions and that when executed by the processor, cause the network device to:

obtain integrity measurement values of measurement objects in the network device based on a plurality of integrity challenge requests of a plurality of remote attestation (RA) servers, wherein at least two of the integrity measurement objects are associated with separate RA servers; and separately send each integrity measurement value of the integrity measurement values to a different RA server of the RA servers that sent an integrity challenge request to enable the different RA servers to perform remote attestation on integrity of a corresponding measurement object of the measurement objects, wherein each integrity measurement value sent is of a different measurement object.

14. The network device of claim 13, wherein the instructions that when executed by the processor further cause the network device to be configured to:

receive the integrity challenge requests from at least one of a plurality of first RA servers;

obtain, in response to the integrity challenge requests, the integrity measurement values of the measurement objects in the network device; and send the integrity measurement values of the measurement objects to at least one of the first RA servers.

15. The network device of claim 13, wherein the instructions that when executed by the processor further cause the network device to:

receive the integrity challenge requests from a primary RA server of the RA servers;

obtain, in response to the integrity challenge requests, the integrity measurement values of the measurement objects in the network device; and send the integrity measurement values of the measurement objects to the primary RA server to enable the primary RA server to send the integrity measurement values to one of a plurality of first RA servers of the RA servers according to a remote attestation policy, wherein the remote attestation policy instructs one of the first RA servers to perform remote attestation on an integrity of the measurement objects, and wherein the remote attestation policy comprises at least one of:

a time sequence relationship of remote attestation on an integrity of a corresponding measurement object in each of a plurality of network devices;

a correspondence between each of the first RA servers and a measurement object on which each of the first RA servers can perform remote attestation;

a relationship between each of the first RA servers and a range of devices measured by each of the first RA servers;

a relationship between each of the first RA servers and a range of measurement objects measured by each of the first RA servers; or usage or availability of a dynamic resource of each of the first RA server.

16. The network device of claim 13, wherein the instructions that when executed by the processor further cause the network device to receive the integrity challenge requests from at least one of a first RA servers of the RA servers according to a remote attestation policy, and wherein the remote attestation policy comprises at least one of:

an instruction to each of the first RA servers to send an integrity challenge request at a specific time point;

an instruction to each of the first RA servers to send an integrity challenge request based on a correspondence between the first RA servers and a first measurement object on which the first RA servers can perform remote attestation;

an instruction to each of the first RA servers to send an integrity challenge request based on a range of devices measured by the first RA servers;

an instruction to each of the first RA servers to send an integrity challenge request based on a range of measurement objects measured by the first RA servers; or an instruction to each of the first RA servers to send an integrity challenge request based on usage of a dynamic resource of the first RA servers or availability of the dynamic resource.

17. The network device of claim 13, further comprising an RA client and a trusted platform module (TPM) chip, wherein the instructions that when executed by the processor further cause the network device to:

obtain, by the RA client, the integrity measurement values from the TPM chip, wherein the integrity measurement values are stored in the TPM chip in a startup process of the network device or a running process of the network device; and send, by the RA client, the integrity measurement values to at least one of the RA servers.

18. The network device of claim 17, wherein the RA client comprises a first RA client and a second RA client, wherein the measurement objects comprise a basic input/output system (BIOS), an operating system (OS), one or more applications (APPs), one or more files, and one or more virtual machines (VMs), wherein the one or more files are stored in the TPM chip in the running process of the network device, wherein each of the one or more VMs comprises one first RA client, and wherein the instructions that when executed by the processor further cause the network device to:

send, by the one first RA client, an integrity measurement value of a corresponding VM to an RA server that corresponds to a VM of the VMs; and send, by the second RA client, an integrity measurement value of another measurement object of other than the one or more VMs to an RA server corresponding to the another measurement object other than the one or more VMs.

* * * * *